United States Patent
Mondal et al.

(10) Patent No.: US 12,555,506 B2
(45) Date of Patent: Feb. 17, 2026

(54) RESONANT CLOCKING EMPLOYING RESONANCE AT FUNDAMENTAL AND HARMONIC FREQUENCIES

(71) Applicant: Intel Corporation, Santa Clara, CA (US)

(72) Inventors: Susnata Mondal, Hillsboro, OR (US); Mozhgan Mansuri, Portland, OR (US)

(73) Assignee: Intel Corporation, Santa Clara, CA (US)

(*) Notice: Subject to any disclaimer, the term of this patent is extended or adjusted under 35 U.S.C. 154(b) by 889 days.

(21) Appl. No.: 17/556,706

(22) Filed: Dec. 20, 2021

(65) Prior Publication Data
US 2023/0196960 A1    Jun. 22, 2023

(51) Int. Cl.
| | |
|---|---|
| G06F 1/10 | (2006.01) |
| G06F 1/06 | (2006.01) |
| G09G 3/20 | (2006.01) |
| H03K 3/037 | (2006.01) |

(52) U.S. Cl.
CPC .............. *G09G 3/20* (2013.01); *G06F 1/06* (2013.01); *G06F 1/10* (2013.01); *H03K 3/037* (2013.01)

(58) Field of Classification Search
CPC .... G09G 3/20; G06F 1/10; G06F 1/06; H03K 3/037
See application file for complete search history.

(56) References Cited

U.S. PATENT DOCUMENTS

| | | | |
|---|---|---|---|
| 5,734,285 A | 3/1998 | Harvey | |
| 2016/0091918 A1* | 3/2016 | Atallah | H03K 19/0008 327/294 |
| 2016/0105161 A1 | 4/2016 | Madhavan et al. | |
| 2019/0041896 A1* | 2/2019 | Wong | G06F 1/10 |
| 2021/0013857 A1 | 1/2021 | Atalla et al. | |

FOREIGN PATENT DOCUMENTS

WO    2017/143252 A1    8/2017

OTHER PUBLICATIONS

Intention to Grant, EP App. No. 22205775.4, Jan. 17, 2025, 6 pages.
(Continued)

*Primary Examiner* — Adam R. Giesy
(74) *Attorney, Agent, or Firm* — NICHOLSON DE VOS WEBSTER & ELLIOTT LLP

(57) ABSTRACT

When an output of a driver circuit is coupled with a coupled-resonator network and a clock distribution network, the driver circuit generates a clock signal comprised of first and second components at first and second frequencies. The second frequency is a harmonic of the first frequency, and the first and second frequencies are in phase. In operation, the coupled-resonator network simultaneously resonates at both the first and second frequencies when coupled with the output of the driver circuit and the clock distribution network. The coupled-resonator network comprises a first inductor and a second inductor that, in operation, are both magnetically coupled and electrically coupled. The driver circuit and coupled-resonator network cooperate to provide a clock signal to the clock distribution network with improvements in slew rate and energy efficiency.

19 Claims, 8 Drawing Sheets

(56) References Cited

OTHER PUBLICATIONS

Bhagavatula, Venumadhav, et al., "An Ultra-Wideband IF Millimeter-Wave Receiver With a 20 GHz Channel Bandwidth Using Gain-Equalized Transformers", IEEE Journal of Solid- State Circuits, vol. 51, No. 2, Feb. 2016, 9 pgs.

Mondal, Susnata, et al., "Power-Efficient Design techniques for mm-Wave Hybrid/Digital FDD/Full-Duplex MIMO Transceivers", IEEE Journal of Solid-State Circuits, vol. 55, No. 8, Aug. 2020, 16 pgs.

European Search Report and Search Opinion, EP App. No. 22205775.4, May 12, 2023, 9 pages.

* cited by examiner

RESONANT CLOCKING EMPLOYING RESONANCE AT FUNDAMENTAL AND HARMONIC FREQUENCIES

BACKGROUND

A significant portion of the power consumed in an integrated circuit is used to drive clock signals to circuit devices requiring a clock signal for operation.

Conventional clocking techniques drive a clock distribution network with a square-wave shaped clock signal. Resonant clocking techniques can drive the same clock distribution network with less energy than conventional clocking techniques. In addition, resonant clocking techniques can result in less jitter than may be experienced with conventional clocking techniques. However, conventional resonant clocking techniques drive a clock distribution network with a sinusoidally shaped clock signal. As a result, resonant clocking techniques can have a poorer slew rate than conventional clocking techniques.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1A:
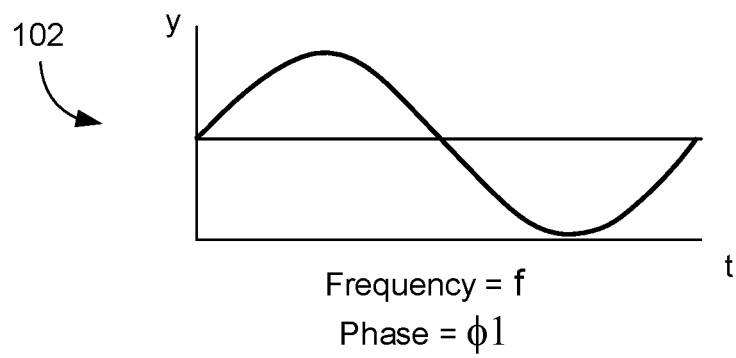
FIGS. 1a, 1b, and 1c illustrate periodic signals in accordance with various embodiments.

Conventional techniques for resonant clocking can have a poorer slew rate than conventional clocking techniques. Embodiments relate generally to apparatus and systems that employ resonant clocking techniques that provide slew rates that are better than conventional techniques for resonant clocking and which may be comparable to conventional clocking techniques. Disclosed herein are embodiments for power efficient resonant clocking having slew-rate improvements that make them useful for applications, such as but not limited to, wireline/optical I/O, e.g., to drive samplers and data serializers in receivers (RX) and transmitters (TX), wireless single-antenna or multi-antenna systems to drive mixers in the TX and RX path, and other communication and data processing systems.

In various embodiments, an apparatus includes a driver circuit to generate a clock signal at an output. When the output is coupled with a coupled-resonator network and a clock distribution network, the generated clock signal comprises both a first component comprising a first frequency at a first phase, and a second component comprising a second frequency at a second phase. The second frequency is a harmonic of the first frequency. In addition, the apparatus includes the coupled-resonator network to receive the clock signal at a node. In response to receiving the clock signal when the coupled-resonator network is coupled with the output of the driver circuit and the clock distribution network at the node, the coupled-resonator network is configured to simultaneously resonate at both the first frequency and first phase of the first component of the clock signal, and the second frequency and second phase of the second component of the clock signal. The coupled-resonator network comprises a first inductor to be magnetically coupled with a second inductor. The first inductor is also to be electrically coupled with the second inductor via a first capacitor.

In some embodiments, the second frequency of the clock signal is a third harmonic of the first frequency. In some embodiments, the second frequency of the clock signal is an odd-integer multiple of the first frequency. By adding an in-phase third harmonic (or other odd-integer multiple of the first frequency) to a conventional resonant clock signal, slew rate may be improved in comparison to conventional techniques for resonant clocking.

In the following description, numerous details are discussed to provide a more thorough explanation of the embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

It is to be understood that the terms so used are interchangeable under appropriate circumstances such that the embodiments described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described, but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

The terms "functional block," "functional unit," or "component" herein generally refer to any circuitry that performs a particular function. A "functional block" or "component" may be a unit of logic, circuit, cell, or chip layout that is reusable. A functional block is sometimes colloquially referred to as an IP (intellectual property) block. A few examples of functional blocks or components include processor cores, memories, caches, floating point processors, memory controllers, bus controllers, graphics processors, transceivers, network interface controllers, and display controllers. One or more portions of a larger functional block can themselves be designated as functional blocks. For example, an instruction execution unit and cache controller can be functional units or components of a processor functional unit. It should be appreciated that the foregoing examples are a non-exhaustive list of functional blocks.

Wherever possible, in this description, the same names and reference numbers are used in the drawings and the description to refer to the same or like parts, components, blocks, signals, and operations. In this regard it should be appreciated that components and signals shown in or described with respect to a particular figure may be shown in or described with respect to other figures of this description. When a part, component, block, signal, or operation having a specific name or reference number is shown or described in a figure other than the particular figure in which it was first referenced, the part, component, block, signal, or operation can operate or function in any manner similar to that described in the particular figure. However, it should be appreciated that these elements with the same reference numbers (or names), when referred to with respect to a figure other than the particular figure in which it was first referenced, are not limited to the manner of operation or function as shown in or described with respect the particular figure.

Embodiments provide a number of advantages. Various embodiments are directed to resonant clocking techniques, which have the advantage of using less energy than conventional clocking techniques. In addition, embodiments advantageously have lower jitter and lower jitter transfer as compared with conventional clocking techniques. Moreover, various embodiments also have the advantage of providing better slew rates than conventional resonant clocking techniques.

A further advantage of the disclosed embodiments is that they are capable of achieving wide pole splitting in a resonator network using techniques that can be fabricated using presently known fabrication processes. This wide pole splitting is achieved with a combination of inductors that are magnetically coupled in a moderate amount and electrically coupled through one or more coupling capacitors. The dual magnetic and electrical coupling provides an advantage with respect to a resonator network with wide pole splitting based only on magnetic coupling, because the inductors required for wide pole splitting in a resonator without electrical coupling require high magnetic coupling, which would likely not be manufacturable using known techniques.

Resonant clocking is a technique in which energy stored in one or more inductors resonate with energy stored in the parasitic capacitance of the clock distribution network. Compared with conventional clocking techniques, resonant clocking can improve energy efficiency because the clock driver only needs to supply enough power to replenish the energy lost to the parasitic resistance of the clock distribution network. Resonance does not occur at all frequencies in a clock distribution network; resonance only occurs at the fundamental and in-phase harmonics of the clock frequency.

Conventional clocking techniques employ a clock driver that generates a clock signal having a square wave shape. The conventional square-wave clock signal includes a fundamental frequency component along with various harmonic components. In contrast, resonant clocking techniques employ a clock driver that generates a clock signal having a sinusoidal shape. The sinusoidally-shaped clock signal used in conventional resonant clocking techniques only includes the fundamental frequency without any harmonic components.

The rise time of a signal is the time for the signal to rise from a lower threshold and cross an upper threshold. For example, the lower threshold may be 10% above a minimum amplitude and the higher threshold may be 90% of a maximum amplitude. A related metric is the slew rate of a signal, which is the rate of change of the waveform. The slew rate is the slope of the waveform at any point or region. A conventional square-wave clock signal achieves a faster rise time and higher slew rate than the sinusoidally-shaped clock signal because of the harmonic components included in the square-wave clock signal.

Figure 1B:
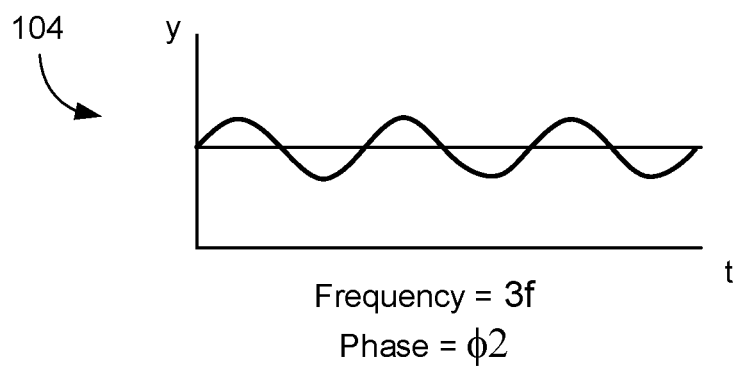
Figure 1C:
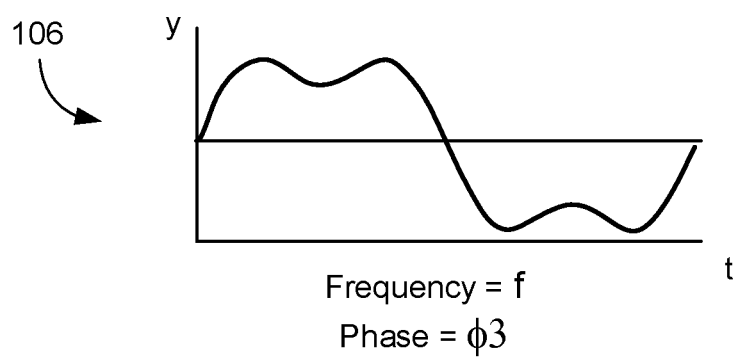

FIG. 1 illustrates periodic signals in accordance with some embodiments. Each graph is a plot of amplitude y versus time t. FIG. 1a is a plot of a sinusoidal signal 102, having a frequency $f$ and phase $\Phi 1$. FIG. 1b is a plot of a sinusoidal signal 104, having a frequency $3 \times f$ and phase $\Phi 2$. Signal 104 is the third harmonic of signal 102. FIG. 1c is a plot of a periodic signal 106, having a frequency $f$ and phase $\Phi 3$. Signal 106 is the sum of signals 102 and 104. It can be seen from FIG. 1, that a signal that is the sum of a fundamental frequency and its third harmonic, e.g., signal 106, has faster rise time and higher slew rate than a signal comprised of only the fundamental frequency, e.g., signal 102. It can also be seen that signal 106 includes ripple. A signal with ripple can serve as a clock signal provided the ripple is not too large. It can also be seen that phase $\Phi 1$ equals phase $\Phi 2$. In order to generate signal 106 that can be used to drive a clock distribution network, phases $\Phi 1$ and $\Phi 2$ need to be equal, or at least need to be substantially or approximately equal. In some embodiments, phases $\Phi 1$ and $\Phi 2$ are not required to be equal, provided they agree within a particular range, e.g., 5%, 10%.

Figure 2:
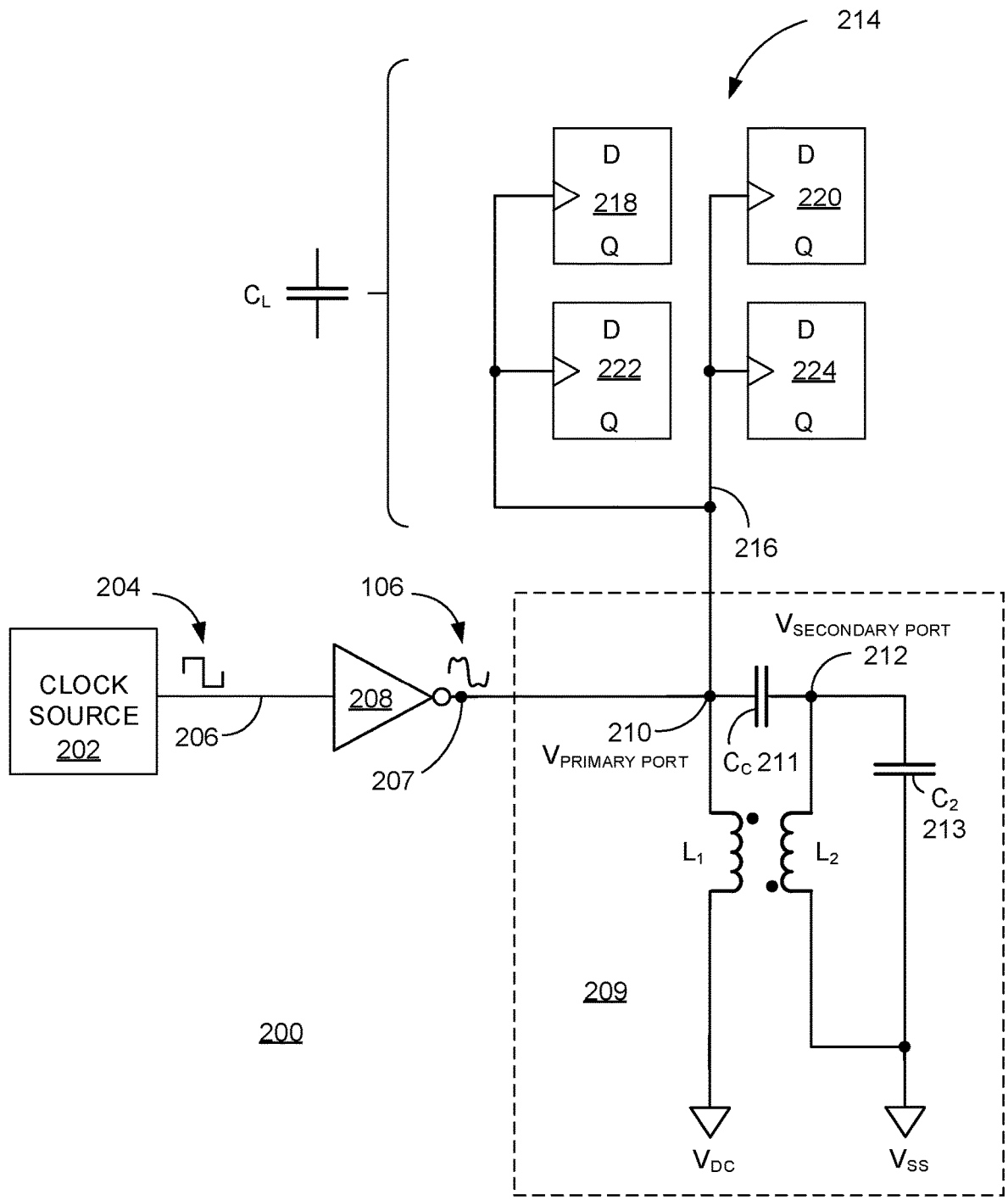
FIG. 2 illustrates a resonant clocking apparatus in accordance with various embodiments.

FIG. 2 illustrates a resonant clocking apparatus 200 in accordance with some embodiments. A clock source 202 generates a first periodic signal 204, which may be a conventional clock signal having the form of a square wave. The clock source 202 may be any of a wide variety of clock drivers known in the art. The clock source 202 may be fabricated on-chip, or it may be situated externally to an integrated circuit (IC).

A driver circuit 208 receives the first periodic signal 204 via an electrical conductor 206. The driver circuit 208 generates a second periodic signal 106 based on the first periodic signal at an output 207. In embodiments, second periodic signal 106 is a clock signal. The driver circuit 208 may be any of a wide variety of clock drivers known in the art. In some embodiments, driver circuit 208 is an inverter, as shown in the figure. In some embodiments, driver circuit 208 is a buffer, or other suitable circuitry. In various embodiments, a property of driver circuit 208 is that it generates a sinusoidal signal having fundamental frequency component and a harmonic component, e.g., second periodic signal 106, based on a square wave signal, e.g., first periodic signal 204, received on an input. In various embodiments, driver circuit 208 generates the second periodic signal 106 at a first power level.

The second periodic signal or clock signal 106 comprises two components: a first component, e.g., signal 102, at a first frequency and first phase, and a second component, e.g., signal 104, at a second frequency and second phase. In various embodiments, the second frequency is a harmonic of the first frequency. In various embodiments, the second frequency is an odd-integer multiple of the fundamental frequency. In an embodiment, the second frequency is the third harmonic of the fundamental frequency. In other embodiments, the second frequency may be the fifth, seventh, or ninth harmonic of the fundamental frequency.

It is not essential that the second phase of the second frequency of a clock signal generated by a clock driver according to the principles described herein be exactly in phase with the first phase of a first or fundamental frequency. In various embodiments, the second phase is substantially equal to the first phase. For example, the second phase of the second frequency may be in a range comprised of 10% or less of the first phase of the first or fundamental frequency of a clock signal.

A coupled-resonator network 209 is coupled to the driver circuit 208 via a first node 210, according to various embodiments. Coupled-resonator network 209 comprises first node 210 ($V_{PRIMARY\ PORT}$) and a second node 212 ($V_{SECONDARY\ PORT}$). In addition, coupled-resonator network 209 comprises a first inductor $L_1$, a second inductor $L_2$, a first capacitor $C_C$ 211 and a second capacitor $C_2$ 213. The network 209 may be referred to as a "coupled-resonator" network because, in operation, second inductor $L_2$ is simultaneously both: magnetically coupled with first inductor $L_1$, and electrically coupled with first inductor $L_1$ via first capacitor $C_C$ 211. First capacitor $C_C$ 211 is coupled to first inductor $L_1$ via first node 210 and coupled to second inductor $L_2$ via second node 212. Second capacitor $C_2$ 213 is coupled to second inductor $L_2$ via second node 212 and to ground $V_{SS}$. Second inductor $L_2$ is also coupled to ground $V_{SS}$. First inductor $L_1$ is coupled to direct current voltage $V_{DC}$. The amount of magnetic coupling between first inductor $L_1$ and second inductor $L_2$ is given by the coefficient of coupling k. The amount of electrical coupling between first inductor $L_1$ and second inductor $L_2$ is given by the capacitive value of first capacitor $C_C$ 211. Component values are selected so that, in operation, coupled-resonator network 209, in response to receiving the clock signal 106 when coupled with the output of driver circuit 208 and clock distribution network 214 at the first node 210, simultaneously resonates at both the first frequency and first phase of the first component and the second frequency and second phase of the second component of the second periodic or clock signal 106.

In embodiments, the coupled-resonator network or resonator circuit 209 provides a fine-grained, small-range phase correction capability through tuning the value of first capacitor $C_C$ 211. In some embodiments, a phase correction range of approximately 20 degrees is provided. Accordingly, the coupled-resonator network or resonator circuit 209 attenuates or mitigates a difference between a first phase of the first component and a second phase of the second component, and the degree of attenuation is adjustable. In addition, it should be appreciated that coupled-resonator network or resonator circuit 209 reduces input duty cycle error by approximately two fold. The residual duty cycle error can be corrected by tuning $V_{DC}$.

It is not essential that a coupled-resonator network according to the principles described herein resonate at exactly the first frequency and first phase of a clock signal. In various embodiments, a coupled-resonator network resonates at substantially the first frequency and first phase. For example, a coupled-resonator network may resonate at frequency in a range comprised of 10% or less of the first frequency of the clock signal. In addition, a coupled-resonator network may resonate at a phase in a range comprised of 10% or less of the first phase of the first frequency of the clock signal.

It is not essential that a coupled-resonator network according to the principles described herein resonate exactly at the second frequency and second phase of a clock signal. In various embodiments, a coupled-resonator network resonates at substantially the second frequency and second phase. For example, a coupled-resonator network may resonate at frequency in a range comprised of 10% or less of the second frequency of the clock signal. In addition, a coupled-resonator network may resonate at a phase in a range comprised of 10% or less of the second phase of the second frequency of the clock signal.

In operation, driver circuit 208 and coupled-resonator network 209 cooperate to provide clock signal at first node 210, each providing part of the total energy of the clock signal 106. At the first node 210 ($V_{PRIMARY\ PORT}$), the first component of the second periodic signal 106 is in phase with the second component of the second periodic signal 106. It should be appreciated that the signal at second node 212 ($V_{SECONDARY\ PORT}$) has one component at a third frequency and third phase, and another component at a fourth frequency and fourth phase. However, although the third frequency is substantially equal to the first frequency, and the fourth frequency is substantially equal to the second frequency, the fourth phase is approximately 180 degrees out of phase with the third phase. Hence, the component at the fourth frequency will create distortion rather than improve the slew rate of the resonant clock signal at first node 210. Therefore, the signal at second node 212 cannot be used to provide a resonant clock signal with improved slew rate. In some embodiments, the clock frequency may be 16 GHz. However, embodiments are not limited to 16 GHz and various embodiments contemplate other frequencies.

In various embodiments, coupled-resonator network 209 is coupled to a clock distribution network 214 at first node 210. Clock distribution network 214 comprises one or more devices (218, 220, 222, 224), e.g., latches, flip-flops, etc., and an electrical conductor 216. The electrical conductor 216 is coupled with the first node 210 and various devices that are to receive the clock signal. In operation, clock distribution network 214 receives the clock signal 106 via first node 210. The parasitic capacitance of clock distribution network 214 is referred to in this description as $C_L$. In subsequent figures of this description, clock distribution network 214 may be represented by only the circuit symbol for equivalent capacitance $C_L$ in order to simplify the figures. It should be understood that the circuit symbol for equivalent capacitance $C_L$ represents clock distribution network 214.

In various embodiments, the quantity of energy in clock signal 106 is an amount required to provide a sufficient clock signal to all devices in clock distribution network 214. A first portion of the required energy is provided by driver circuit 208. A second portion of the required energy is provided by coupled-resonator network 209. In various embodiments, the second portion of energy is greater than the first portion of energy in second periodic or clock signal 106. In various embodiments, the first portion of energy provided by driver circuit 208 is less than the amount of energy required to provide a sufficient clock signal to all devices in clock distribution network 214. Accordingly, an advantage of resonant clocking apparatus 200 is that it uses less energy than a conventional clock driver would use to drive clock distribution network 214. Driver circuit 208 only needs to supply enough power to replenish the energy lost to the parasitic resistance of the clock distribution network 214.

As noted above, driver circuit 208 generates a clock signal 106 comprised of two components: a first component, e.g., signal 102, and a second component, e.g., signal 104. First and second components may each have a distinct amplitude. In various embodiments, the first component has a first amplitude, denoted A1, and the second component has a second amplitude, denoted A2. In various embodiments, the first amplitude is greater than the second amplitude. As will be discussed below, the first amplitude may be in a range that is three to ten times greater than the second amplitude.

While driver circuit 208 generates a clock signal comprised of two components: a first component that may be a fundamental frequency and a second component that may be a harmonic of the fundamental frequency, in other embodiments, a driver circuit may generate a second periodic signal comprised of more than two components. For example, a driver circuit may generate a second periodic signal comprised three components: a first component at a fundamental frequency, a second component at a third harmonic of the fundamental frequency, and a third component at a fifth harmonic of the fundamental frequency. In embodiments in which a driver circuit generates a second periodic signal comprised of more than two components, a coupled-resonator network is provided that resonates at each of the more than two component frequencies.

Figure 3:
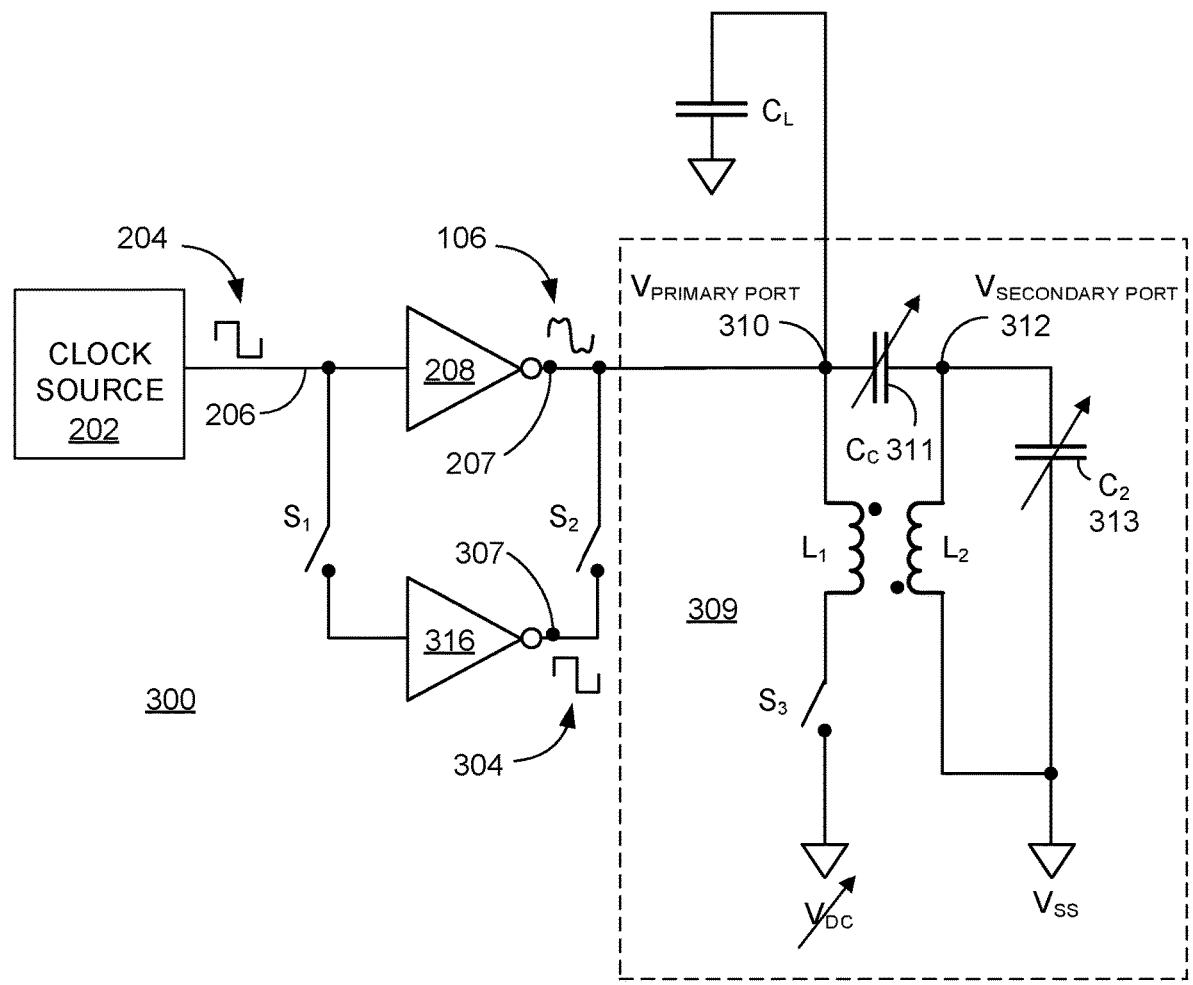
FIG. 3 illustrates a clocking apparatus having resonant and non-resonant modes of operation in accordance with various embodiments.

FIG. 3 illustrates a clocking apparatus 300 having resonant and non-resonant modes of operation in accordance with some embodiments. Clocking apparatus 300 is capable of operating in a first mode in which it provides a resonant clock signal at a first clock frequency and a second mode in which it provides a non-resonant clock signal at a second clock frequency. In some embodiments, the first clock frequency may be 16 GHz and the second clock frequency may be 8 GHz. Clocking apparatus 300 includes a mechanism for adjusting the resonance frequency of the coupled-resonator. Clocking apparatus 300 also includes a mechanism for fine-grain tuning of the phase of the second periodic signal over a particular range. In some embodiments, the phase can be adjusted over correction range of about 20°.

The clocking apparatus 300 includes several components that may be the same as or similar to those of resonant clocking apparatus 200 in some embodiments. Clock source 202 generates a first periodic signal 204, which may be a conventional clock signal having the form of a square wave. Driver circuit 208 receives the first periodic signal 204 via an electrical conductor 206 and generates a second periodic or clock signal 106 based on the first periodic signal at output 207. In some embodiments, the first periodic signal 204 and the second periodic signal 106 may be the same as described above with reference to resonant clocking apparatus 200. The clocking apparatus 300 generates a clock signal for clock distribution network 214, represented in FIG. 3 by reference Cu In some embodiments, the clock distribution network 214 may be the same as described above with reference to resonant clocking apparatus 200.

Clocking apparatus 300 differs from clocking apparatus 200 in that it includes a second driver circuit 316 and switching circuitry (S1, S2, and S3). Clocking apparatus 300 includes a switch S1 for selectively coupling an input of second driver circuit 316 to clock source 202, and a switch S2 for selectively coupling an output 307 of second driver circuit 316 to a first node 310 of a coupled-resonator network 309.

Coupled-resonator network 309 comprises first inductor L1, second inductor $L_2$, a first capacitor $C_C$ 311, and a second capacitor $C_2$ 313. In some embodiments, L1 and $L_2$ may be the same as described above with reference to resonant clocking apparatus 200. Clocking apparatus 300 also differs from clocking apparatus 200 in that the capacitive values of one or both of first capacitor $C_C$ 311 and second capacitor $C_2$ 313 are variable. In various embodiments, first capacitor $C_C$ 311 may comprise two or more discrete capacitors and switching circuitry that can be controlled to connect the two or more discrete capacitors in parallel or series (or in a combined parallel and series arrangement) to provide two more discrete capacitive values for first capacitor $C_C$ 311. As one example, first capacitor $C_C$ 311 may have capacitive values switchable between 1, 2, 4, and 8 times a reference capacitive value. Similarly, in various embodiments, second capacitor $C_2$ 313 may comprise two or more discrete capacitors and switching circuitry that can be controlled to connect the two or more discrete capacitors in parallel or series (or in a combined parallel and series arrangement) to provide two more discrete capacitive values for second capacitor $C_2$ 313. As an example, second capacitor $C_2$ 313 may have capacitive values switchable between 1, 2, 4, and 8 times a reference capacitive value.

In coupled-resonator network 309, $L_2$ is simultaneously both magnetically coupled with first inductor $L_1$, and electrically coupled with first inductor $L_1$ via first capacitor $C_C$ 311. First capacitor $C_C$ 311 is coupled to first inductor $L_1$ via first node 310 and coupled to second inductor $L_2$ via second node 312. Second capacitor $C_2$ 313 is coupled to second inductor $L_2$ via second node 312. Second inductor $L_2$ is also coupled to ground $V_{SS}$. First inductor $L_1$ is coupled to direct current voltage $V_{DC}$. Coupled-resonator network 309 differs from coupled-resonator network 209 in that it includes a switch S3 connected between first inductor L1 and $V_{DC}$. In addition, in various embodiments, $V_{DC}$ is provided at a variable value that may be varied in response to a control signal.

Clocking apparatus 300 can be operated in the first mode in which it provides a resonant clock signal at a first clock frequency. In the first mode, switches S1 and S2 are open, and S3 is closed. In operation, driver circuit 208 receives the first periodic signal 204 via an electrical conductor 206, and, when output 207 is coupled with the coupled-resonator network 309 and clock distribution network $C_L$, driver circuit 208 generates a second periodic or clock signal 106. In a manner similar to coupled-resonator network 209, coupled-resonator network 309, in response to receiving the clock signal 106 when coupled with the output 207 of driver circuit 208 and clock distribution network $C_L$ at the first node 310, simultaneously resonates at both the first frequency and first phase of the first component and the second frequency and second phase of the second component of the second periodic or clock signal 106.

Clocking apparatus 300 can be operated in the second mode in which it provides a non-resonant clock signal at a second clock frequency. In the second mode, switches S1 and S2 are closed, and S3 is open. In operation, driver circuit 208 receives the first periodic signal 204 and generates a clock signal (not shown). Driver circuit 208 generates a clock signal in the form of a square wave (similar to signal 304) at a first power level. In addition, driver circuit 316 receives the first periodic signal 204 and generates periodic signal 304. In various embodiments, periodic signal 304 is a square wave signal. Driver circuit 316 generates periodic signal 304 at a second power level. In various embodiments, the second power level is higher than the first power level. Driver circuit 316 sources and sinks more current than driver circuit 208. Accordingly, in non-resonant mode, driver circuit 316 advantageously increases the power in the clock signal provided to the clock distribution network as compared with the amount of power that would be provided by driver circuit 208 alone. Driver circuit 316 also improves the slew rate that driver circuit 208 alone provides. Coupled-resonator network 309 does not contribute in a significant way to the clock signal provided at the first node 310. The clock signal provided at the first node 310 is provided at a power level that is at or above the amount of power required to provide a sufficient clock signal to all devices in clock distribution network 214.

Figure 4:
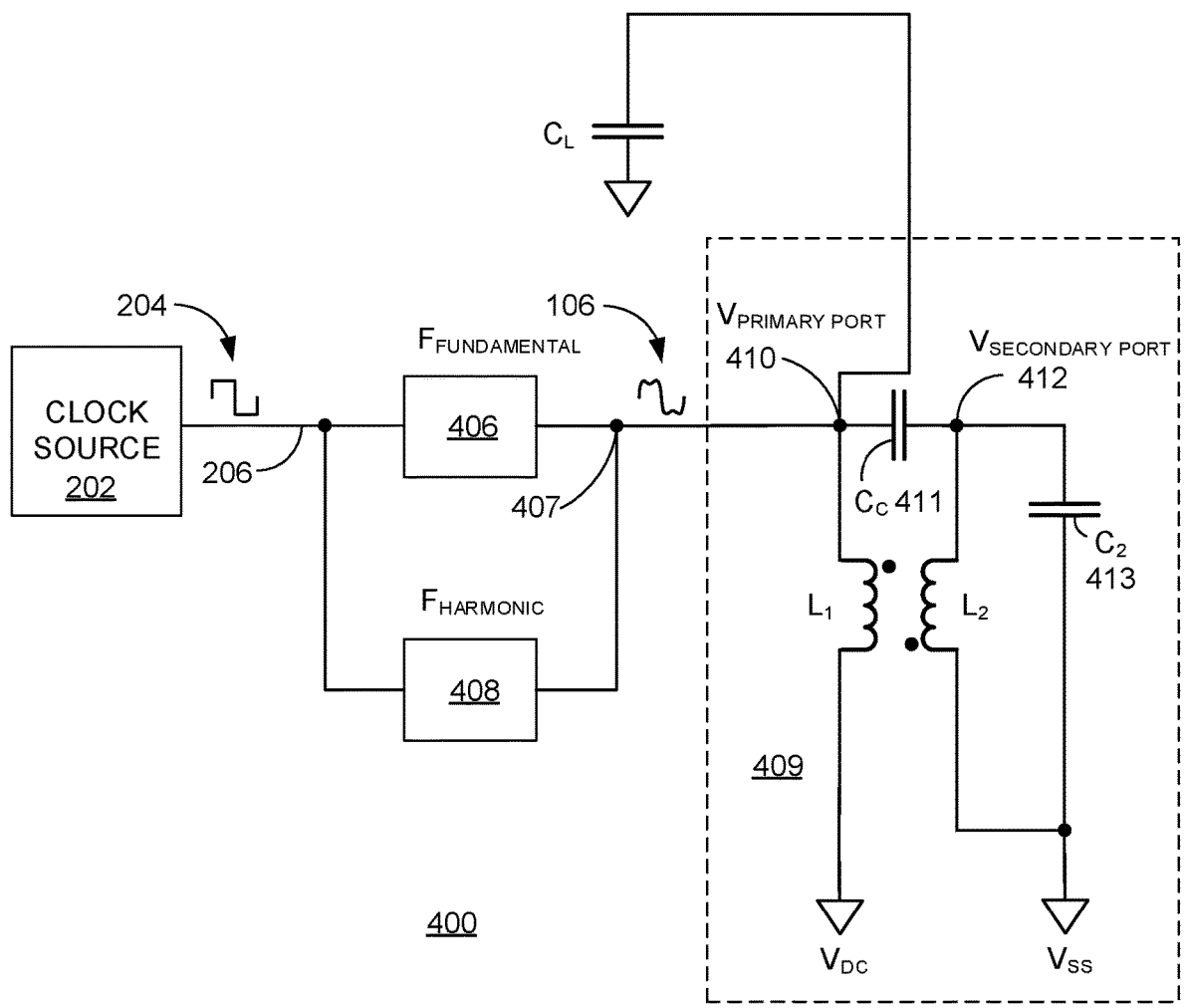
FIG. 4 illustrates a resonant clocking apparatus having two driver circuits in accordance with various embodiments.

FIG. 4 illustrates a resonant clocking apparatus having driver circuitry comprising two driver circuits in accordance with some embodiments. Specifically, resonant clocking apparatus 400 comprises driver circuitry the includes a first driver circuit 406, a second driver circuit 408, and an output 407. Several components that may be the same as or similar to those of resonant clocking apparatus 200 are included in resonant clocking apparatus 400 in some embodiments. Clock source 202 generates a first periodic signal 204, which may be a conventional clock signal having the form of a square wave. Coupled-resonator network 409 comprises first inductor L1, second inductor $L_2$, a first capacitor $C_C$ 411, and a second capacitor $C_2$ 413. Coupled-resonator network 409 comprises first node 410 ($V_{PRIMARY\ PORT}$) and second node 412 ($V_{SECONDARY\ PORT}$). In some embodiments, first inductor L1, second inductor $L_2$, first capacitor $C_C$ 411, and second capacitor $C_2$ 413 may be coupled in the same way as described above with reference to coupled-resonator network 209. Resonant clocking apparatus 400 generates a clock signal 106 at output 407 for clock distribution network 214, represented in FIG. 4 by reference $C_L$. In some embodiments, the clock distribution network 214 may be the same as described above with reference to resonant clocking apparatus 200.

First driver circuit 406 and second driver circuit 408 each receive first periodic signal 204 via an electrical conductor 206. First driver circuit 406 generates a fundamental periodic signal that is a fundamental or first harmonic of a frequency and which is based on first periodic signal 204. Second driver circuit 408 generates a harmonic periodic signal that is an odd-integer harmonic of the fundamental frequency and which is based on first periodic signal 204. In some embodiments, second driver circuit 408 generates a harmonic periodic signal that is a third harmonic of the fundamental frequency. In various embodiments, first driver circuit 406 and second driver circuit 408 together generate the clock signal 106. The second periodic or clock signal 106 comprises two components: a first frequency at a first phase, and a second frequency at a second phase. Coupled-resonator network 409, in response to receiving the clock signal 106 when coupled with the output of the driver circuits 406 and 408, and clock distribution network at the first node 410, simultaneously resonates at both the first frequency and first phase of the first component and the second frequency and second phase of the second component of the clock signal 106.

In various embodiments, first driver circuit 406 generates the first component of clock signal 106, which may be a fundamental periodic signal at a first power level. Second driver circuit 408 generates the second component of the clock signal 106, which may be a harmonic periodic signal, e.g., a signal at an odd-integer harmonic of the first component, at a second power level. In various embodiments, the first power level is higher than the second power level. In operation, coupled-resonator network 409 receives the clock signal 106 via first node 410

While resonant clocking apparatus 400 includes two driver circuits 406, 408, in other embodiments, a clocking apparatus can have three or more driver circuits. As one example, a clocking apparatus may include a first driver circuit that generates a periodic signal at fundamental frequency, a second driver circuit that generates a periodic signal at a third harmonic of the fundamental frequency, and third driver circuit that generates a periodic signal at a fifth harmonic of the fundamental frequency. In embodiments in which clocking apparatus has three or more driver circuits, coupled-resonator network 409 is configured to resonate at each frequency.

Figure 5:
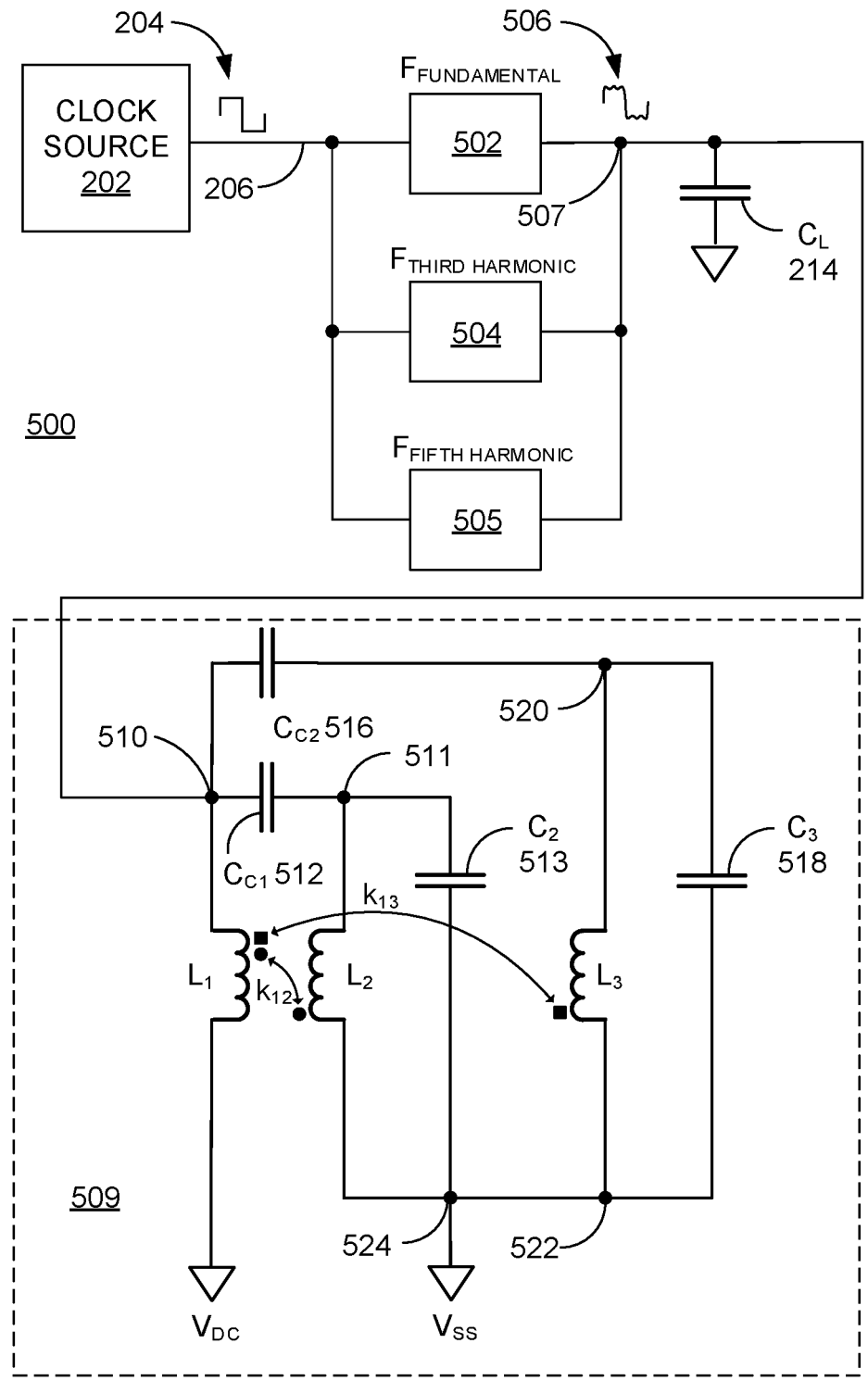
FIG. 5 illustrates a resonant clocking apparatus having a coupled-resonator network configured to resonate at a plurality of harmonic frequencies in accordance with various embodiments.

FIG. 5 illustrates a resonant clocking apparatus having a coupled-resonator network configured to resonate at a plurality of harmonic frequencies in accordance with various embodiments. Driver circuitry comprises driver circuits 502, 504, and 505. Driver circuit 502 generates a first sinusoidal signal at a first frequency and first phase, which can be a fundamental frequency with respect to harmonic frequencies. Driver circuit 504 generates a second sinusoidal signal at a second frequency and second phase. In an embodiment, the second frequency is the third harmonic of the first frequency, and the second phase is substantially equal to the first phase. Driver circuit 505 generates a third sinusoidal signal at a third frequency and third phase. In an embodiment, the third frequency is the fifth harmonic of the first frequency, and the third phase is substantially equal to the first phase. The first, second, and third sinusoidal signals are superimposed at driver circuitry output node 507 to provide a clock signal 506.

Accordingly, the clock signal 506 comprises three components: a first component, i.e., a first frequency at a first phase; a second component, i.e., a second frequency at second phase; and a third component, i.e., a third frequency at third phase. In other embodiments, one or more additional driver circuits may be provided to generate a clock signal comprised of more than three components, where each harmonic component is an odd-integer multiple of the fundamental frequency. It should be appreciated that each of the components of clock signal 506 has an amplitude and the amplitude of the harmonic components is less than the amplitude of the fundamental frequency.

According to various embodiments, a coupled-resonator network 509 is coupled to the output of the driver circuitry 507 via a first node 510. The coupled-resonator network 509 comprises a first inductor $L_1$, a second inductor $L_2$, and a third inductor $L_3$. When the coupled-resonator network 509 is operating, first inductor $L_1$ and second inductor $L_2$ are magnetically coupled and amount of magnetic coupling is given by the coefficient of coupling $k_{12}$. In addition, when coupled-resonator network 509 is operating, first inductor $L_1$ and third inductor $L_3$ are magnetically coupled and amount of magnetic coupling is given by the coefficient of coupling $k_{13}$.

In various embodiments, the coupled-resonator network 509 also includes a first coupling capacitor $C_{C1}$ 512 that, in operation, electrically couples first inductor $L_1$ with second inductor $L_2$. In addition, the coupled-resonator network 509 includes a second coupling capacitor $C_{C2}$ 516 that, in operation, electrically couples first inductor $L_1$ with third inductor $L_3$. Accordingly, when coupled-resonator network 509 is operating, first inductor $L_1$ and second inductor $L_2$ are simultaneously both magnetically and electrically coupled, and first inductor $L_1$ and third inductor $L_3$ are simultaneously both magnetically and electrically coupled.

Coupled-resonator network 509 comprises first node 510 and second node 511. A first terminal of first inductor $L_1$ is coupled with first node 510. A first terminal of second inductor $L_2$ is coupled with second node 511. First coupling capacitor $C_{C1}$ 512 is connected between first node 510 and second node 511 to electrically couple the first inductor $L_1$ and second inductor $L_2$.

Coupled-resonator network 509 comprises third node 520. As noted, a first terminal of first inductor $L_1$ is coupled with first node 510. A first terminal of third inductor $L_3$ is coupled with third node 520. Second coupling capacitor $C_{C2}$ 516 is connected between first node 510 and third node 520 to electrically couple the first inductor $L_1$ and third inductor $L_3$.

Coupled-resonator network 509 also comprises second capacitor $C_2$ 513, third capacitor $C_3$ 518, node 522, node 524, ground $V_{SS}$, and direct current voltage $V_{DC}$. Second capacitor $C_2$ 513 is coupled to second inductor $L_2$ via second node 511 and to ground $V_{SS}$ via node 524. Third capacitor $C_3$ 518 is coupled to third inductor $L_3$ via third node 520 and to ground $V_{SS}$ via node 522. Second inductor $L_2$ is also coupled to ground $V_{SS}$. First inductor $L_1$ is coupled to direct current voltage $V_{DC}$.

Clock distribution network 214 is coupled with driver circuits 502, 504, and 505 at output 507 and coupled-resonator network 509 at first node 510. Component values are selected so that, in operation, coupled-resonator network 509, in response to receiving the clock signal 506 when coupled with the output of the driver circuitry and clock distribution network 214 at the first node 210, simultaneously resonates at the first frequency and first phase of the first component, the second frequency and second phase of the second component, and the third frequency and third phase of the third component of the clock signal 506.

Figure 6:
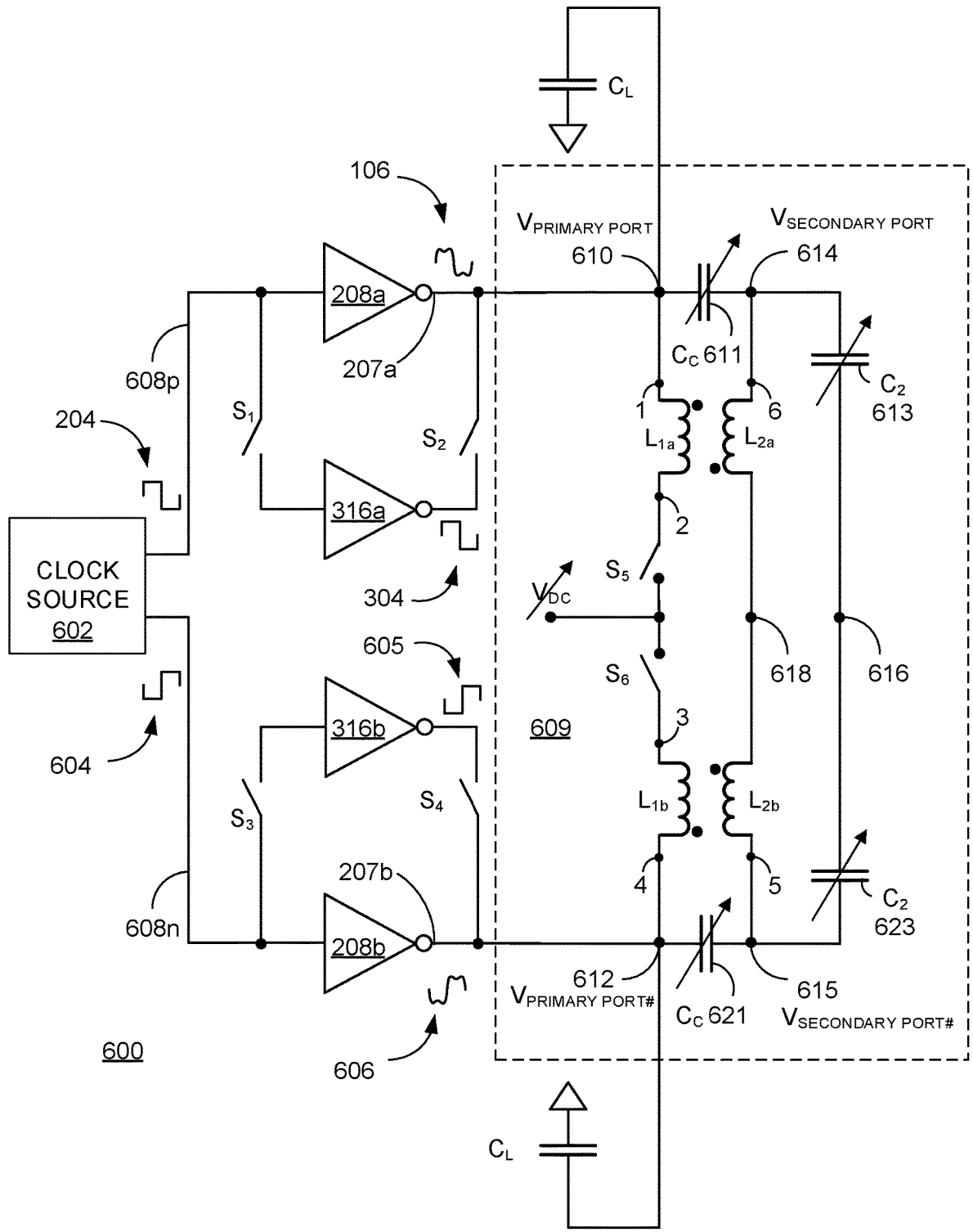
FIG. 6 illustrates a clocking apparatus for a differential clock signal that provides resonant and non-resonant modes of operation in accordance with various embodiments.

FIG. 6 illustrates a clocking apparatus 600 for a differential clock signal that provides resonant and non-resonant modes of operation, in accordance with various embodiments.

Clocking apparatus 600 comprises a differential clock source 602 that generates a double-ended clock signal, driver circuits 208a, 208b, 316a, and 316b for receiving the clock signals, and a coupled-resonator network 609. A clock distribution network 214 is coupled to coupled-resonator network 609 at first node 610, and phase-offset first node 612, where differential clock signals are provided. Clock distribution network 214 is represented in FIG. 6 with the circuit symbols $C_L$ corresponding with its equivalent capacitance.

Clocking apparatus 600 comprises switching circuitry (switches S1, S2, S3, S4, S5, and S6) that is controlled to switch between resonant and non-resonant modes of operation. For resonant mode of operation, switches S1, S2, S3, and S4 are opened, and switches S5 and S6 are closed. For non-resonant mode of operation, switches S1, S2, S3, and S4 are closed, and switches S5 and S6 are opened. In resonant mode, driver circuits 316a, 316b are decoupled from clocking apparatus 600. In non-resonant mode, driver circuits 316a, 316b are coupled to clocking apparatus 600, and coupled-resonator network 609 does not contribute in a significant way to the clock signals provided at first nodes 610, 612. Resonant mode is described first.

Clock source 602 generates two signals: first periodic signal 204 and a phase-offset first periodic signal 604. The first periodic signal 204 may be the same signal as described above with respect to FIG. 2, i.e., a conventional clock signal having the form of a square wave. Phase-offset first periodic signal 604 is the same as first periodic signal 204 except that it is 180 degrees out of phase with signal 204. Accordingly, first periodic signal 204 and phase-offset first periodic signal 604 may both be conventional double-ended clock signals having the form of a square wave that are 180 degrees out of phase with each other. The clock source 602 may be any of a wide variety of clock drivers known in the art. The clock source 602 may be fabricated on-chip, or it may be situated externally to an IC.

Coupled-resonator network 609 is coupled to driver circuit 208a via a first node 610, and to driver circuit 208b via phase-offset first node 612, according to various embodiments. Driver circuit 208a receives first periodic signal 204 via an electrical conductor 608p. Driver circuit 208a generates a second periodic or clock signal 106 based on the first periodic signal. Driver circuit 208a generates the clock signal at an output 207a. Driver circuit 208b receives phase-offset first periodic signal 604 via an electrical conductor 608n. Driver circuit 208b generates a phase-offset second periodic signal 606, which may be a complementary clock signal, based on the first periodic signal. Driver circuit 208b generates the complementary clock signal at an output 207b. Second periodic (or clock) signal 106 is provided at first node 610. Phase-offset second periodic (or complementary clock) signal 606 is provided at phase-offset first node 612.

Coupled-resonator network 609 comprises first node 610 and phase-offset first node 612, both of which are primary port nodes ($V_{PRIMARY\ PORT}$). In addition, coupled-resonator network 609 comprises second node 614 and phase-offset second node 615, both of which are secondary port nodes ($V_{SECONDARY\ PORT}$). Coupled-resonator network 609 also comprises first and second coupling capacitors $C_C$ 611, 621, and second capacitors $C_2$ 613, 623.

It should be appreciated that the phrase "resonator circuit" may be used in this specification and, in the claims, to refer to a "coupled-resonator network," e.g., networks 209, 309, 409, 509, and 609.

In various embodiments, the coupled-resonator network or resonator circuit described herein provide a fine-grained, small-range phase correction capability through tuning the value of capacitors that electrically couple inductors, e.g., $C_C$ 211, $C_C$ 311, $C_C$ 411, $C_{C1}$ 512, $C_{C2}$ 516, $C_C$ 611, and $C_C$ 621. In some embodiments, a phase correction range of approximately 20 degrees is provided. Accordingly, the coupled-resonator network or resonator circuit 209 attenuates or mitigates a difference between a first phase of the first component and a second phase of the second component, and the degree of attenuation is adjustable. In addition, it should be appreciated that coupled-resonator network or resonator circuit reduces input duty cycle error by approximately two fold. The residual duty cycle error can be corrected by tuning $V_{DC}$.

Figure 7:
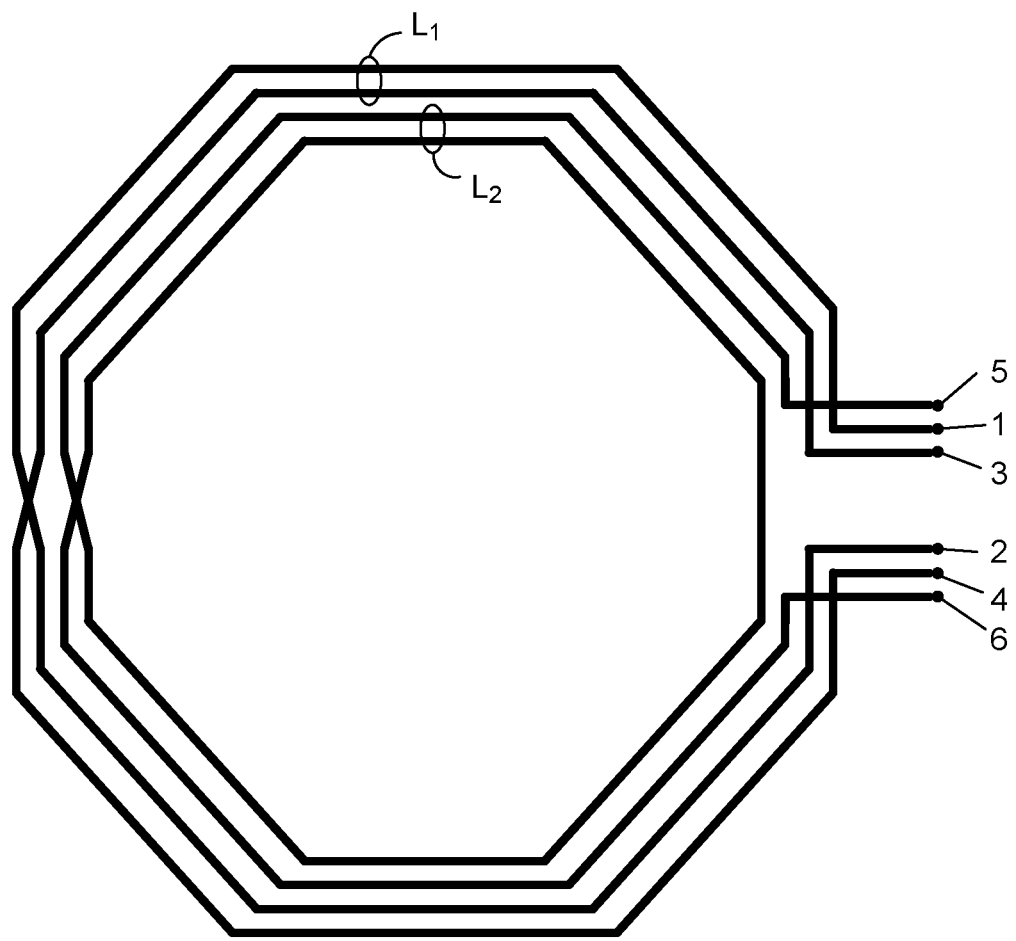
FIG. 7 is a plan view of first inductors and second inductors constructed according to various embodiments.

Coupled-resonator network 609 comprises first inductors $L_{1a}$, $L_{1b}$ and second inductors $L_{2a}$, $L_{2b}$ (structure 700). FIG. 7 is a plan view of first inductors $L_{1a}$, $L_{1b}$ and second inductors $L_{2a}$, $L_{2b}$ constructed according to various embodiments. In an embodiment, first and second inductors are electrical conductors constructed in one layer of an IC. In another embodiment, first and second inductors are electrical conductors constructed in two layers of an IC. First inductors Lia, Lib and second inductors $L_{2a}$, $L_{2b}$ may be fabricated using known lithographic techniques. The arrangement of first inductors $L_{1a}$, $L_{1b}$ and second inductors $L_{2a}$, $L_{2b}$, is not limited to the arrangement shown in FIG. 7: any suitable arrangement may be used. Reference numbers 1, 2, 3, and 4 indicate respective terminals of first inductors Lia, Lib, and are the same as those shown in FIG. 6. Reference numbers 5 and 6 indicate respective terminals of second inductors $L_{2a}$, $L_{2b}$, and are the same as those shown in FIG. 6.

In resonant mode operation, second inductor $L_{2a}$ is simultaneously both: magnetically coupled with first inductor $L_{1a}$, and electrically coupled with first inductor $L_{1a}$ via first capacitor $C_C$ 611. Similarly, second inductor $L_{2b}$ is simultaneously both: magnetically coupled with first inductor $L_{1b}$, and electrically coupled with first inductor Lib via second coupling capacitor $C_C$ 621. This dual coupling may be equivalently stated as: second inductor $L_2$ (i.e., $L_{2a}$ and $L_{2b}$) is both: magnetically coupled with first inductor $L_1$ (i.e., $L_{1a}$ and $L_{1b}$), and electrically coupled with first inductor $L_1$ via first coupling capacitor $C_C$ (611 and 621).

First coupling capacitor $C_C$ 611 is coupled to first inductor Lia via first node 610 and coupled to second inductor $L_{2a}$ via second node 614. Second capacitor $C_2$ 613 is coupled to second inductor $L_{2a}$ via second node 614 and to second capacitor $C_2$ 623 at connection 616. Second coupling capacitor $C_C$ 621 is coupled to first inductor Lib via first node 612 and coupled to second inductor $L_{2b}$ via second node 615. Second capacitor $C_2$ 623 is coupled to second inductor $L_{2b}$ via second node 615 and to second capacitor $C_2$ 613 at connection 616. Second inductor $L_{2a}$ is coupled to second inductor $L_2$b via node 618.

First inductor $L_1$ (i.e., $L_{1a}$ and $L_{1b}$) is coupled to direct current voltage $V_{DC}$ when clocking apparatus 600 is operated in resonant modes of operation. In various embodiments, $V_{DC}$ is provided at a variable value that may be varied in response to a control signal. Switches S5 and S6 respectively connect $L_{1a}$ and $L_{1b}$ to $V_{DC}$ when closed.

The amount of magnetic coupling between first inductor $L_1$ (i.e., Lia and Lib) and second inductor $L_2$ (i.e., $L_{2a}$ and $L_{2b}$) is given by the coefficient of coupling k. The amount of electrical coupling between first inductor $L_1$ and second inductor $L_2$ is given by the capacitive values of first and second coupling capacitors $C_C$ 611 621. Component values are selected so that, in operation, coupled-resonator network 609, when connected to the driver circuits 208a, 208b and clock distribution network 214, simultaneously resonate at the first frequency of the first component and the second frequency of the second component of the clock signals 106, 606.

In resonant mode operation, coupled-resonator network 609 receives clock signal 106 at first node 610, and receives complimentary clock signal 606 at phase-offset first node 612. As noted above, the second periodic or clock signal 106 comprises two components: a first component, e.g., signal 102 at a first frequency and first phase, and a second component, e.g., signal 104 at a second frequency and second phase. The complimentary clock signal 606 includes these two components 180° out of phase. In various embodiments, the second frequency is a harmonic of the first frequency. In various embodiments, the second frequency is an odd-integer multiple of the fundamental frequency. In an embodiment, the second frequency is the third harmonic of the fundamental frequency. In various embodiments, the first phase is substantially equal to the second phase.

In resonant operating mode, driver circuits 208a, 208b and coupled-resonator network 609 cooperate to provide a differential clock signal at first nodes 610, 612. The clock signal at first node 610 is comprised of the first component and an in-phase portion of the second component of the second periodic signal 106. The clock signal 606 at first node 612 is comprised of a phase-offset portion of the first component, where the phase-offset portion of first component is 180° out of phase, which is in-phase with a phase-offset portion of the second component, where the phase-offset second component is also 180° out of phase.

It should be appreciated that the differential signal at second nodes 614, 615 ($V_{SECONDARY\ PORT}$) has one component at third frequency and third phase, and another component at fourth frequency and fourth phase. However, although third frequency is substantially equal to the first frequency and fourth frequency is substantially equal to the second frequency, the fourth phase is approximately 180 degrees out of phase with the third phase, and hence, the component at the fourth frequency will create distortion rather than improving the slew rate of the resonant clock signal. Therefore, the signal at second nodes 614, 615 cannot be used to provide a resonant clock signal with improved slew rate.

Examples of approximate component values for coupled-resonator network 609 are: $C_L$=200 fF, $L_1$=220 pH, $L_2$=145 pH, k=0.5, $C_2$=35 fF to 140 fF, and $C_C$=65 fF to 225 fF. The resonant mode frequencies of the coupled-resonator networks described herein can be tuned through $C_C$ and the secondary side capacitor ($C_2$) to enable operation across a frequency range.

As noted above, second periodic (or clock) signal 106 is comprised of two or more components, e.g., a first component, e.g., signal 102, and a second component, e.g., signal 104. Second periodic signal (or complimentary clock) 606 also comprises of similar two or more components that are 180° out of phase with the components of second periodic signal 106. Each component of signal 106 and signal 606 has a distinct amplitude. Amplitudes of the first components may be denoted A1 and amplitudes of the second components may be denoted A2. A parameter r may be defined as a ratio of A2/A1. As one example, r=1/3 indicates that the amplitude of second component 1/3 of the amplitude of the first component of the second periodic signal 106.

A simulation of an embodiment of clocking apparatus 600 indicated an improvement in slew rate as compared with conventional resonant clocking. Depending on the value of r, the slew rate was seen to be 1-2.5 times better than conventional resonant clocking. However, the amount of ripple present in the time-domain waveform increases with increasing values of r. The simulation indicated that an acceptable amount of ripple (less than 15%) was achievable when A1 and A2 were selected to provide a r value in a range between 0.1 and 0.35. Accordingly, driver circuit may be selected or designed to provide amplitudes A1 and A2 such that the amount of ripple in the clock signal is acceptable. In various embodiments, the first amplitudes A1 are greater than the second amplitudes A2. In various embodiments, driver circuits disclosed herein have a property that the first and second amplitudes produce an r value ranging between 0.1 and 0.35. In various embodiments, the first amplitude may be in a range that is three to ten times greater than the second amplitude. It should be appreciated that the amplitudes of the fundamental and harmonic components are not limited to particular values or ranges of r. The values and r range are design choices that will vary depending on the particular implementation. Moreover, in some embodiments, ripple may be managed into an acceptable range by the addition of one or more additional harmonic components are different multiples of the fundamental frequency.

In resonant mode operation, second inductor $L_2$ (i.e., $L_{2a}$ and $L_{2b}$) is simultaneously both: magnetically coupled with first inductor $L_1$ (i.e., $L_{1a}$ and $L_{1b}$), and electrically coupled with first inductor $L_1$ via first and second coupling capacitors $C_C$ (611 and 621). This coupling mechanism results in pole splitting, where one pole can be placed at the $1^{st}$ harmonic ($f_1$) and the other at the $3^{rd}$ harmonic ($f_2$) of the clock frequency. This pole splitting is illustrated by equations (1), (2), and (3), which are for $L_1$ (Lia and Lib)=$L_2$ ($L_{2a}$ and $L_{2b}$)=L, and $C_C$ (611 and 621)=$C_2$ (613 and 623)=C.

$$f_1 \frac{1}{\sqrt{LC(1-k)}} \quad (1)$$

$$f_2 \frac{\sqrt{(1-k_C)}}{\sqrt{LC(1+k)}} \quad (2)$$

where:

$$k_C = \frac{2C_C}{(2C_C + C_2)} \quad (3)$$

While it is theoretically possible to obtain wide pole splitting using only inductive coupling, this approach requires high coupling factors, e.g., k=0.8. The high coupling factors required may not be realizable on chip or may be difficult to achieve using most presently known fabrication processes. This is because two inductors need to be closely spaced to achieve high coupling. Inductors are made from thick metal with low resistance in a typical fabrication process. If both inductors are drawn side-by-side using the same metal layer, there is a limit as to how closely they can be spaced without violating DRC fabrication rules. Positioning the two inductors too close in an attempt to achieve a high coupling factor may cause an electrical short.

In contrast, the disclosed embodiments are capable of achieving wide pole splitting with moderate inductive coupling (e.g., k=0.5), which can be fabricated using presently known fabrication processes. Coupled resonators, according to various embodiments, utilize a moderate inductive coupling along with an additional electrical coupling mechanism through coupling capacitors ($C_C$) from the primary to the secondary coil. This combination of magnetic and electric coupling results in wide pole splitting and gain equalization between the two pole frequencies. Moreover, moderate inductive coupling makes coupled-resonators realizable on chip while consuming area similar to only a single inductor footprint.

In non-resonant mode, switches S1, S2, S3, and S4 are controlled so that driver circuits 316a, 316b are respectively coupled to first nodes 610, 612. In addition, switches S5 and S6 are controlled so that coupled-resonator network 609 does not contribute in a significant way to the clock signals provided at first nodes 610, 612.

In non-resonant mode operation, driver circuit 208a receives the first periodic signal 204 and generates a clock signal (not shown). Driver circuit 208a generates a clock signal in the form of a square wave (similar to signal 204) at a first power level. In addition, driver circuit 316a receives the first periodic signal 204 and generates periodic signal 304. In various embodiments, periodic signal 304 is a square wave signal. Driver circuit 316a generates periodic signal at a second power level. In various embodiments, the second power level is higher than the first power level. Driver circuit 316a sources and sinks more current than driver circuit 208a.

In addition, in non-resonant mode operation, driver circuit 208b receives the first periodic signal 604 and generates a clock signal (not shown). Driver circuit 208b generates a clock signal in the form of a square wave (similar to signal 604) at a third power level. In addition, driver circuit 316b receives the first periodic signal 604 and generates periodic signal 605. In various embodiments, periodic signal 605 is a square wave signal. Driver circuit 316b generates periodic signal at a fourth power level. In various embodiments, the fourth power level is higher than the third power level. Driver circuit 316b sources and sinks more current than driver circuit 208b.

The clock signal provided at the first node 610 is comprised of the clock signal output from driver 208a and periodic signal 304. The clock signal provided at the first node 612 is comprised of the complementary clock signal output from driver 208b and periodic signal 605. The differential clock signals provided at the first nodes 610, 612 are provided at power levels that is at or above the amount of power required to provide a sufficient clock signal to all devices in clock distribution network 214.

In non-resonant mode, driver circuits 316a, 316b advantageously increase the power in the clock signal provided to the clock distribution network as compared with the amount of power that would be provided by driver circuits 208a, 208b alone. Driver circuits 316a, 316b also improve the slew rate that driver circuits 208a, 208b alone provide. Coupled-resonator network 609 does not contribute in a significant way to the clock signal provided at the first nodes 610, 612. The clock signals provided at the first nodes 610, 612 are provided at power levels that are at or above the amount of power required to provide a sufficient clock signal to all devices in clock distribution network 214.

Figure 8:
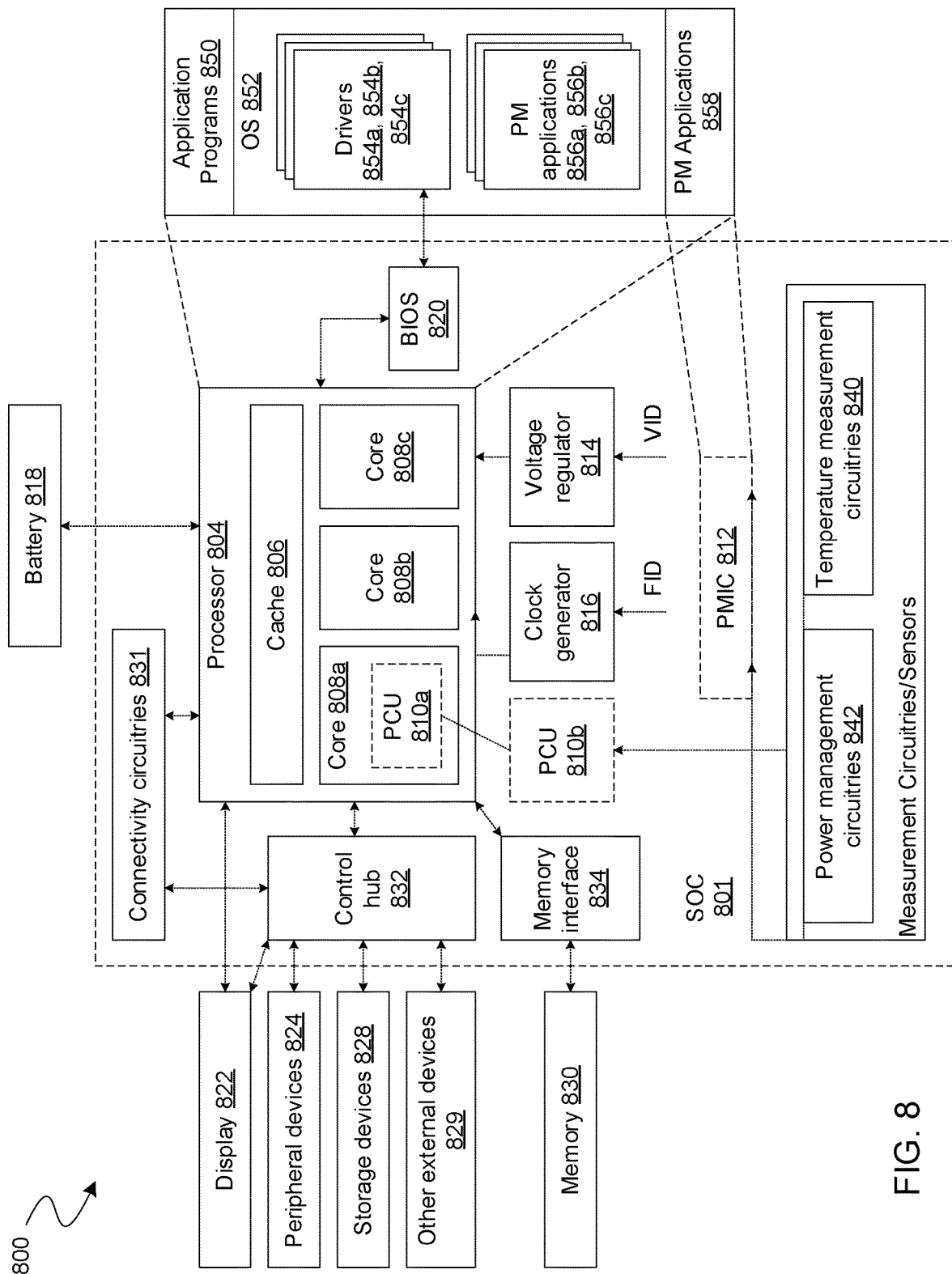
FIG. 8 illustrates a smart device or a computer system or an SoC (System-on-Chip) having a resonant clocking apparatus or a clocking apparatus having a resonant mode in accordance with various embodiments.

FIG. 8 illustrates a smart device or a computer system or an SoC (System-on-Chip) having a resonant clocking apparatus or a clocking apparatus having a resonant mode in accordance with various embodiments. It is pointed out that those elements of FIG. 8 having the same reference numbers (or names) as the elements of any other figure can operate or function in any manner similar to that described, but are not limited to such.

In some embodiments, device 800 represents an appropriate computing device, such as a computing tablet, a mobile phone or smart-phone, a laptop, a desktop, an Internet-of-Things (IOT) device, a server, a wearable device, a set-top box, a wireless-enabled e-reader, or the like. It will be understood that certain components are shown generally, and not all components of such a device are shown in device 800.

In an example, the device 800 comprises a SoC (System-on-Chip) 801. An example boundary of the SOC 801 is illustrated using dotted lines in FIG. 8, with some example components being illustrated to be included within SOC 801— however, SOC 801 may include any appropriate components of device 800.

In some embodiments, device 800 includes processor 804. Processor 804 can include one or more physical devices, such as microprocessors, application processors, microcontrollers, programmable logic devices, processing cores, or other processing means. The processing operations performed by processor 804 include the execution of an operating platform or operating system on which applications and/or device functions are executed. The processing operations include operations related to I/O (input/output) with a human user or with other devices, operations related to power management, operations related to connecting computing device 800 to another device, and/or the like. The processing operations may also include operations related to audio I/O and/or display I/O.

In some embodiments, processor 804 includes multiple processing cores (also referred to as cores) 808a, 808b, 808c. Although merely three cores 808a, 808b, 808c are illustrated in FIG. 8, the processor 804 may include any other appropriate number of processing cores, e.g., tens, or even hundreds of processing cores. Processor cores 808a, 808b, 808c may be implemented on a single integrated circuit (IC) chip. Moreover, the chip may include one or more shared and/or private caches, buses or interconnections, graphics and/or memory controllers, or other components.

In some embodiments, processor 804 includes cache 806. In an example, sections of cache 806 may be dedicated to individual cores 808 (e.g., a first section of cache 806 dedicated to core 808a, a second section of cache 806 dedicated to core 808b, and so on). In an example, one or more sections of cache 806 may be shared among two or more of cores 808. Cache 806 may be split in different levels, e.g., level 1 (L1) cache, level 2 (L2) cache, level 3 (L3) cache, etc.

In some embodiments, a given processor core (e.g., core 808a) may include a fetch unit to fetch instructions (including instructions with conditional branches) for execution by the core 808a. The instructions may be fetched from any storage devices such as the memory 830. Processor core 808a may also include a decode unit to decode the fetched instruction. For example, the decode unit may decode the fetched instruction into a plurality of micro-operations. Processor core 808a may include a schedule unit to perform various operations associated with storing decoded instructions. For example, the schedule unit may hold data from the decode unit until the instructions are ready for dispatch, e.g., until all source values of a decoded instruction become available. In one embodiment, the schedule unit may schedule and/or issue (or dispatch) decoded instructions to an execution unit for execution.

The execution unit may execute the dispatched instructions after they are decoded (e.g., by the decode unit) and dispatched (e.g., by the schedule unit). In an embodiment, the execution unit may include more than one execution unit (such as an imaging computational unit, a graphics computational unit, a general-purpose computational unit, etc.). The execution unit may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit.

Further, an execution unit may execute instructions out-of-order. Hence, processor core 808a (for example) may be an out-of-order processor core in one embodiment. Processor core 808a may also include a retirement unit. The retirement unit may retire executed instructions after they are committed. In an embodiment, retirement of the executed instructions may result in processor state being committed from the execution of the instructions, physical registers used by the instructions being de-allocated, etc. The processor core 808a may also include a bus unit to enable communication between components of the processor core 808a and other components via one or more buses. Processor core 808a may also include one or more registers to store data accessed by various components of the core 808a (such as values related to assigned app priorities and/or sub-system states (modes) association.

In some embodiments, device 800 comprises connectivity circuitries 831. For example, connectivity circuitries 831 includes hardware devices (e.g., wireless and/or wired connectors and communication hardware) and/or software components (e.g., drivers, protocol stacks), e.g., to enable device 800 to communicate with external devices. Device 800 may be separate from the external devices, such as other computing devices, wireless access points or base stations, etc.

In an example, connectivity circuitries 831 may include multiple different types of connectivity. To generalize, the connectivity circuitries 831 may include cellular connectivity circuitries, wireless connectivity circuitries, etc. Cellular connectivity circuitries of connectivity circuitries 831 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, 3rd Generation Partnership Project (3GPP) Universal Mobile Telecommunications Systems (UMTS) system or variations or derivatives, 3GPP Long-Term Evolution (LTE) system or variations or derivatives, 3GPP LTE-Advanced (LTE-A) system or variations or derivatives, Fifth Generation (5G) wireless system or variations or derivatives, 5G mobile networks system or variations or derivatives, 5G New Radio (NR) system or variations or derivatives, or other cellular service standards. Wireless connectivity circuitries (or wireless interface) of the connectivity circuitries 831 refers to wireless connectivity that is not cellular, and can include personal area networks (such as Bluetooth, Near Field, etc.), local area networks (such as Wi-Fi), and/or wide area networks (such as WiMax), and/or other wireless communication. In an example, connectivity circuitries 831 may include a network interface, such as a wired or wireless interface, e.g., so that a system embodiment may be incorporated into a wireless device, for example, cell phone or personal digital assistant.

In some embodiments, device 800 comprises control hub 832, which represents hardware devices and/or software components related to interaction with one or more I/O devices. For example, processor 804 may communicate with one or more of display 822, one or more peripheral devices 824, storage devices 828, one or more other external devices 829, etc., via control hub 832. Control hub 832 may be a chipset, a Platform Control Hub (PCH), and/or the like.

For example, control hub 832 illustrates one or more connection points for additional devices that connect to device 800, e.g., through which a user might interact with the system. For example, devices (e.g., devices 829) that can be attached to device 800 include microphone devices, speaker or stereo systems, audio devices, video systems or other display devices, keyboard or keypad devices, or other I/O devices for use with specific applications such as card readers or other devices.

As mentioned above, control hub 832 can interact with audio devices, display 822, etc. For example, input through a microphone or other audio device can provide input or commands for one or more applications or functions of device 800. Additionally, audio output can be provided instead of, or in addition to display output. In another example, if display 822 includes a touch screen, display 822 also acts as an input device, which can be at least partially managed by control hub 832. There can also be additional buttons or switches on computing device 800 to provide I/O functions managed by control hub 832. In one embodiment, control hub 832 manages devices such as accelerometers, cameras, light sensors or other environmental sensors, or other hardware that can be included in device 800. The input can be part of direct user interaction, as well as providing environmental input to the system to influence its operations (such as filtering for noise, adjusting displays for brightness detection, applying a flash for a camera, or other features).

In some embodiments, control hub 832 may couple to various devices using any appropriate communication protocol, e.g., PCIe (Peripheral Component Interconnect Express), USB (Universal Serial Bus), Thunderbolt, High Definition Multimedia Interface (HDMI), Firewire, etc.

In some embodiments, display 822 represents hardware (e.g., display devices) and software (e.g., drivers) components that provide a visual and/or tactile display for a user to interact with device 800. Display 822 may include a display interface, a display screen, and/or hardware device used to provide a display to a user. In some embodiments, display 822 includes a touch screen (or touch pad) device that provides both output and input to a user. In an example, display 822 may communicate directly with the processor 804. Display 822 can be one or more of an internal display device, as in a mobile electronic device or a laptop device or an external display device attached via a display interface (e.g., DisplayPort, etc.). In one embodiment display 822 can be a head mounted display (HMD) such as a stereoscopic display device for use in virtual reality (VR) applications or augmented reality (AR) applications.

In some embodiments and although not illustrated in the figure, in addition to (or instead of) processor 804, device 800 may include Graphics Processing Unit (GPU) comprising one or more graphics processing cores, which may control one or more aspects of displaying contents on display 822.

Control hub 832 (or platform controller hub) may include hardware interfaces and connectors, as well as software components (e.g., drivers, protocol stacks) to make peripheral connections, e.g., to peripheral devices 824.

It will be understood that device 800 could both be a peripheral device to other computing devices, as well as have peripheral devices connected to it. Device 800 may have a "docking" connector to connect to other computing devices for purposes such as managing (e.g., downloading and/or uploading, changing, synchronizing) content on device 800. Additionally, a docking connector can allow device 800 to connect to certain peripherals that allow computing device 800 to control content output, for example, to audiovisual or other systems.

In addition to a proprietary docking connector or other proprietary connection hardware, device 800 can make peripheral connections via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, connectivity circuitries 831 may be coupled to control hub 832, e.g., in addition to, or instead of, being coupled directly to the processor 804. In some embodiments, display 822 may be coupled to control hub 832, e.g., in addition to, or instead of, being coupled directly to processor 804.

In some embodiments, device 800 comprises memory 830 coupled to processor 804 via memory interface 834. Memory 830 includes memory devices for storing information in device 800. Memory can include nonvolatile (state does not change if power to the memory device is interrupted) and/or volatile (state is indeterminate if power to the memory device is interrupted) memory devices. Memory device 830 can be a dynamic random access memory (DRAM) device, a static random access memory (SRAM) device, flash memory device, phase-change memory device, or some other memory device having suitable performance to serve as process memory. In one embodiment, memory 830 can operate as system memory for device 800, to store data and instructions for use when the one or more processors 804 executes an application or process. Memory 830 can store application data, user data, music, photos, documents, or other data, as well as system data (whether long-term or temporary) related to the execution of the applications and functions of device 800.

Elements of various embodiments and examples are also provided as a machine-readable medium (e.g., memory 830) for storing the computer-executable instructions (e.g., instructions to implement any other processes discussed herein). The machine-readable medium (e.g., memory 830) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, device 800 comprises temperature measurement circuitries 840, e.g., for measuring temperature of various components of device 800. In an example, temperature measurement circuitries 840 may be embedded, or coupled or attached to various components, whose temperature are to be measured and monitored. For example, temperature measurement circuitries 840 may measure temperature of (or within) one or more of cores 808*a*, 808*b*, 808*c*, voltage regulator 814, memory 830, a mother-board of SOC 801, and/or any appropriate component of device 800.

In some embodiments, device 800 comprises power measurement circuitries 842, e.g., for measuring power consumed by one or more components of the device 800. In an example, in addition to, or instead of, measuring power, the power measurement circuitries 842 may measure voltage and/or current. In an example, the power measurement circuitries 842 may be embedded, or coupled or attached to various components, whose power, voltage, and/or current consumption are to be measured and monitored. For example, power measurement circuitries 842 may measure power, current and/or voltage supplied by one or more voltage regulators 814, power supplied to SOC 801, power supplied to device 800, power consumed by processor 804 (or any other component) of device 800, etc.

In some embodiments, device 800 comprises one or more voltage regulator circuitries, generally referred to as voltage regulator (VR) 814. VR 814 generates signals at appropriate voltage levels, which may be supplied to operate any appropriate components of the device 800. Merely as an example, VR 814 is illustrated to be supplying signals to processor 804 of device 800. In some embodiments, VR 814 receives one or more Voltage Identification (VID) signals, and generates the voltage signal at an appropriate level, based on the VID signals. Various type of VRs may be utilized for the VR 814. For example, VR 814 may include a "buck" VR, "boost" VR, a combination of buck and boost VRs, low dropout (LDO) regulators, switching DC-DC regulators, etc. Buck VR is generally used in power delivery applications in which an input voltage needs to be transformed to an output voltage in a ratio that is smaller than unity. Boost VR is generally used in power delivery applications in which an input voltage needs to be transformed to an output voltage in a ratio that is larger than unity. In some embodiments, each processor core has its own VR which is controlled by PCU 810*a/b* and/or PMIC 812. In some embodiments, each core has a network of distributed LDOs to provide efficient control for power management. The LDOs can be digital, analog, or a combination of digital or analog LDOs.

In some embodiments, device 800 comprises one or more clock generator circuitries, generally referred to as clock generator 816. Clock generator 816 generates clock signals at appropriate frequency levels, which may be supplied to any appropriate components of device 800. Merely as an example, clock generator 816 is illustrated to be supplying clock signals to processor 804 of device 800. In some embodiments, clock generator 816 receives one or more Frequency Identification (FID) signals, and generates the clock signals at an appropriate frequency, based on the FID signals.

In some embodiments, device 800 comprises battery 818 supplying power to various components of device 800. Merely as an example, battery 818 is illustrated to be supplying power to processor 804. Although not illustrated in the figures, device 800 may comprise a charging circuitry, e.g., to recharge the battery, based on Alternating Current (AC) power supply received from an AC adapter.

In some embodiments, device 800 comprises Power Control Unit (PCU) 810 (also referred to as Power Management Unit (PMU), Power Controller, etc.). In an example, some sections of PCU 810 may be implemented by one or more processing cores 808, and these sections of PCU 810 are symbolically illustrated using a dotted box and labelled PCU 810*a*. In an example, some other sections of PCU 810 may be implemented outside the processing cores 808, and these sections of PCU 810 are symbolically illustrated using a dotted box and labelled as PCU 810*b*. PCU 810 may implement various power management operations for device 800. PCU 810 may include hardware interfaces, hardware circuitries, connectors, registers, etc., as well as software components (e.g., drivers, protocol stacks), to implement various power management operations for device 800.

In some embodiments, device 800 comprises Power Management Integrated Circuit (PMIC) 812, e.g., to implement various power management operations for device 800. In some embodiments, PMIC 812 is a Reconfigurable Power Management ICs (RPMICs) and/or an IMVP (Intel® Mobile Voltage Positioning). In an example, the PMIC is within an IC chip separate from processor 804. The PMIC 812 may implement various power management operations for device 800. PMIC 812 may include hardware interfaces, hardware circuitries, connectors, registers, etc., as well as software components (e.g., drivers, protocol stacks), to implement various power management operations for device 800.

In an example, device 800 comprises one or both PCU 810 or PMIC 812. In an example, any one of PCU 810 or PMIC 812 may be absent in device 800, and hence, these components are illustrated using dotted lines.

Various power management operations of device 800 may be performed by PCU 810, by PMIC 812, or by a combination of PCU 810 and PMIC 812. For example, PCU 810 and/or PMIC 812 may select a power state (e.g., P-state) for various components of device 800. For example, PCU 810 and/or PMIC 812 may select a power state (e.g., in accordance with the ACPI (Advanced Configuration and Power Interface) specification) for various components of device 800. Merely as an example, PCU 810 and/or PMIC 812 may cause various components of the device 800 to transition to a sleep state, to an active state, to an appropriate C state (e.g., CO state, or another appropriate C state, in accordance with the ACPI specification), etc. In an example, PCU 810 and/or PMIC 812 may control a voltage output by VR 814 and/or a frequency of a clock signal output by the clock generator, e.g., by outputting the VID signal and/or the FID signal, respectively. In an example, PCU 810 and/or PMIC 812 may control battery power usage, charging of battery 818, and features related to power saving operation.

The clock generator 816 can comprise a phase locked loop (PLL), frequency locked loop (FLL), or any suitable clock source. In some embodiments, each core of processor 804 has its own clock source. As such, each core can operate at a frequency independent of the frequency of operation of the other core. In some embodiments, PCU 810 and/or PMIC 812 performs adaptive or dynamic frequency scaling or adjustment. For example, clock frequency of a processor core can be increased if the core is not operating at its maximum power consumption threshold or limit. In some embodiments, PCU 810 and/or PMIC 812 determines the operating condition of each core of a processor, and opportunistically adjusts frequency and/or power supply voltage of that core without the core clocking source (e.g., PLL of that core) losing lock when the PCU 810 and/or PMIC 812 determines that the core is operating below a target performance level. For example, if a core is drawing current from a power supply rail less than a total current allocated for that core or processor 804, then PCU 810 and/or PMIC 812 can temporarily increase the power draw for that core or processor 804 (e.g., by increasing clock frequency and/or power supply voltage level) so that the core or processor 804 can perform at a higher performance level. As such, voltage and/or frequency can be increased temporality for processor 804 without violating product reliability.

In an example, PCU 810 and/or PMIC 812 may perform power management operations, e.g., based at least in part on receiving measurements from power measurement circuitries 842, temperature measurement circuitries 840, charge level of battery 818, and/or any other appropriate information that may be used for power management. To that end, PMIC 812 is communicatively coupled to one or more sensors to sense/detect various values/variations in one or more factors having an effect on power/thermal behavior of the system/platform. Examples of the one or more factors include electrical current, voltage droop, temperature, operating frequency, operating voltage, power consumption, inter-core communication activity, etc. One or more of these sensors may be provided in physical proximity (and/or thermal contact/coupling) with one or more components or logic/IP blocks of a computing system. Additionally, sensor(s) may be directly coupled to PCU 810 and/or PMIC 812 in at least one embodiment to allow PCU 810 and/or PMIC 812 to manage processor core energy at least in part based on value(s) detected by one or more of the sensors.

Also illustrated is an example software stack of device 800 (although not all elements of the software stack are illustrated). Merely as an example, processors 804 may execute application programs 850, Operating System 852, one or more Power Management (PM) specific application programs (e.g., generically referred to as PM applications 858), and/or the like. PM applications 858 may also be executed by the PCU 810 and/or PMIC 812. OS 852 may also include one or more PM applications 856*a*, 856*b*, 856*c*. The OS 852 may also include various drivers 854*a*, 854*b*, 854*c*, etc., some of which may be specific for power management purposes. In some embodiments, device 500 may further comprise a Basic Input/Output System (BIOS) 820. BIOS 820 may communicate with OS 852 (e.g., via one or more drivers 854), communicate with processors 804, etc.

For example, one or more of PM applications 858, 856, drivers 854, BIOS 820, etc. may be used to implement power management specific tasks, e.g., to control voltage and/or frequency of various components of device 800, to control wake-up state, sleep state, and/or any other appropriate power state of various components of device 800, control battery power usage, charging of the battery 818, features related to power saving operation, etc.

As described above, device 800 comprises one or more clock generator circuitries, generally referred to as clock generator 816. Resonant clocking apparatus 200, clocking apparatus 300, resonant clocking apparatus 400, resonant clocking apparatus 500, and clocking apparatus 600 are specific examples of these one or more clock generator circuitries generally referred to as clock generator 816. In various embodiments, device 800 comprises one or more instances of a resonant clocking apparatus or a clocking apparatus having a resonant mode according to the principles described herein. An instance of a resonant clocking apparatus is used to drive a clock signal to a local clock distribution network in various embodiments. In some embodiments, clocking apparatus 300 and clocking apparatus 600 are used to drive a clock signal to a local clock distribution network at two different frequencies. In some embodiments, resonant clocking apparatus 200, clocking apparatus 300, resonant clocking apparatus 400, and resonant clocking apparatus 500 are used to drive a single-ended clock signal to a local clock distribution network. In some embodiments, clocking apparatus 600, is used to drive a differential clock signal to a local clock distribution network.

Driver circuits 208, 316, 406, 408, 502, 504, and 505 comprise one or more instances of a circuit or circuitry. Coupled-resonator networks 209, 309, 409, 509, and 609 comprise one or more instances of a circuit or circuitry. As used herein, the terms "circuit" and "circuitry" comprise various electronic and electrical devices ("hardware"). Examples of hardware include analog circuits and analog circuit components (e.g., resistors, capacitors, inductors, diodes, and transistors). Other examples of hardware include digital circuits and digital circuit components, such as logic devices implementing Boolean functions. Examples of digital circuits include programmable logic devices (PLD), field programmable gate arrays (FPGA), application specific integrated circuits (ASIC), processors, processor cores, microprocessors, microcontrollers, digital signal processors (DSP), and graphics processors. In yet another example, hardware includes a circuit that may be synthesized using a hardware description language (HDL) and which implements a state machine or other logic circuit. It should be understood that when hardware executes instructions stored in a memory device, the term hardware includes the stored instructions. Additional examples of hardware include volatile and non-volatile memory devices, such as registers, read-only memory (ROM), random access memory (RAM), and flash memory. Circuits and circuitry can include two or more instances of circuitry. Circuits and circuitry may comprise a combination of hardware elements that cooperate to provide one or more functions. A particular instance of a circuits and circuitry may be referred to with a descriptive or non-descriptive label. For example, instances of circuits and circuitry that perform various functions may be referred to as receiver circuitry, processor circuitry, first circuit, or second circuit. Each of two or more instances of a circuit and circuitry can be comprised of distinct components. In addition, two or more instances of a circuit or circuitry can share one or more common components or resources.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well-known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process. The examples can be combined in any combinations. For example, example 4 can be combined with example 2.

Example 1: An apparatus comprising: a driver circuit to generate a clock signal at an output, wherein the clock signal comprises both a first component comprising a first frequency, and a second component comprising a second frequency, wherein the second frequency is a harmonic of the first frequency; and a resonator circuit coupled to the output via a node, the resonator circuit to receive the clock signal at the node while the resonator circuit and the driver circuit are to be coupled to a clock distribution network via the node, wherein, based on an impedance of the clock distribution network, the resonator circuit is to attenuate a difference between a first phase of the first component, and a second phase of the second component, wherein the resonator circuit comprises a first inductor, a second inductor to be magnetically coupled with the first inductor, and a first capacitor which is coupled between the first inductor and the second inductor.

Example 2: The apparatus of example 1, wherein the first capacitor is coupled to the first inductor via the node and coupled to the second inductor via a second node, and a second capacitor is coupled to the second inductor via the second node.

Example 3: The apparatus of example 1, further comprising the clock distribution network to receive the clock signal, the clock distribution network comprising one or more devices coupled with the node via an electrical conductor.

Example 4: The apparatus of example 1, wherein the first component of the clock signal has a first amplitude and the second component of the clock signal has a second amplitude, and the first amplitude is greater than the second amplitude.

Example 5: The apparatus of example 1, wherein the first component of the clock signal has a first amplitude and the second component of the clock signal has a second amplitude, and a ratio of the second amplitude to the first amplitude is a value in a range from 0.1 to 0.35.

Example 6: The apparatus of example 1, wherein the first phase of the first component of the clock signal is substantially equal to the second phase of the second component of the clock signal.

Example 7: The apparatus of example 6, wherein the first phase of the first component of the clock signal is in a range comprised of 10% or less of the second phase of the second component of the clock signal.

Example 8: The apparatus of example 1, wherein the first component of the clock signal has a first slew rate, the clock signal comprising both the first component and the second component has a second slew rate, and the second slew rate is greater than the first slew rate.

Example 9: The apparatus of example 1, wherein the resonator circuit is to simultaneously resonate at both a frequency in a range comprised of 10% or less of the first frequency of the first component of the clock signal, and a frequency in a range comprised of 10% or less of the second frequency of the second component of the clock signal.

Example 10: The apparatus of example 1, wherein the second frequency of the clock signal is a third harmonic of the first frequency.

Example 11: The apparatus of example 1, wherein the second frequency of the clock signal is an odd-integer multiple of the first frequency.

Example 12: The apparatus of example 1, wherein the clock signal comprises one or more components in addition to the first component and the second component, the one or more additional components each comprising a frequency that is an odd-integer multiple of the first frequency.

Example 13: The apparatus of example 1, wherein the clock signal comprises a differential clock signal comprising a first clock signal and a complimentary clock signal; wherein the output of the driver circuit comprises a first output and a second output, and the driver circuit comprises a first driver circuit to generate the first clock signal at the first output, and a second driver circuit to generate the complimentary clock signal at the second output; wherein the node comprises a first node for the resonator circuit to receive the first clock signal, and a complementary node for the resonator circuit to receive the second clock signal; wherein the clock distribution network is coupled with the first node and the second node; and wherein the first inductor comprises a first pair of serially connected inductors, the second inductor comprises a second pair of serially connected inductors, and the first capacitor comprises a first pair of capacitors connected in parallel.

Example 14: The apparatus of example 1, wherein the driver circuit is further to receive a first periodic signal and to generate clock signal based on the first periodic signal, wherein the output of the driver circuit comprises a first output and a second output, and the driver circuit further comprises: a first driver circuit comprising the first output; a second driver circuit comprising the second output; first switch circuitry to couple an input of the second driver circuit with the first periodic signal and the second output of the second driver circuit with the first output of the first driver circuit; and second switch circuitry, wherein the second switch circuitry is to disable the resonator circuit from resonating by disconnecting a terminal of the first inductor from a reference voltage.

Example 15: An apparatus comprising: a driver circuit to generate a first clock signal at a first output and a second clock signal at a second output, wherein the second clock signal is an inverted version of the first clock signal, the first clock signal and the second clock signal each comprise both a first component comprising a first frequency, and a second component comprising a second frequency, wherein the second frequency is a harmonic of the first frequency; and a resonator circuit coupled to the output via first and second nodes, the resonator circuit to receive the first clock signal at the first node and the second clock signal at the second node, while the resonator circuit and the driver circuit are to be coupled to a clock distribution network via the first and second nodes, wherein, based on an impedance of the clock distribution network, the resonator circuit is to attenuate a difference between a first phase of the first component, and a second phase of the second component.

Example 16: The apparatus of example 15, wherein the resonator circuit further comprises: a first inductor to be magnetically coupled with a second inductor and the first inductor to be electrically coupled with the second inductor via a first capacitor; and a third inductor to be magnetically coupled with a fourth inductor and the third inductor to be electrically coupled with the fourth inductor via a second capacitor.

Example 17: The apparatus of example 15, further comprising the clock distribution network, wherein the clock distribution network is coupled with the first node and the second node.

Example 18: The apparatus of example 15, wherein the second frequency of the clock signal is an odd-integer multiple of the first frequency.

Example 19: A system comprising: a processor and a memory to execute an operating system; a display device coupled to the processor, the display device to display an image based on a signal communicated to the display device; a driver circuit to generate a clock signal at an output, the clock signal comprising a first component comprising a first frequency, and a second component comprising a second frequency, the second frequency being a harmonic of the first frequency; and a resonator circuit coupled to the output via a node, the resonator circuit to receive the clock signal at the node while the resonator circuit and the driver circuit are to be coupled to a clock distribution network via the node, wherein, based on an impedance of the clock distribution network, the resonator circuit is to attenuate a difference between a first phase of the first component and a second phase of the second component, wherein the resonator circuit comprises a first inductor, a second inductor to be magnetically coupled with the first inductor, and a first capacitor which is coupled between the first inductor and the second inductor a first capacitor which is coupled between the first inductor and the second inductor.

Example 20: The system of example 19, wherein the first capacitor is coupled to the first inductor via the node and coupled to the second inductor via a second node, and a second capacitor is coupled to the second inductor via the second node.

Example 21: An apparatus comprising: a driver circuit to generate a clock signal at an output, wherein when the output is coupled with a coupled-resonator network and a clock distribution network, the clock signal comprises both a first component comprising a first frequency at a first phase, and a second component comprising a second frequency at a second phase, the second frequency being a harmonic of the first frequency; and the coupled-resonator network to receive the clock signal at a node, and in response to receiving the clock signal when coupled with the output of the driver circuit and the clock distribution network at the node, the coupled-resonator network to simultaneously resonate at both the first frequency and first phase of the first component of the clock signal, and the second frequency and second phase of the second component of the clock signal, wherein the coupled-resonator network comprises a first inductor to be magnetically coupled with a second inductor and the first inductor to be electrically coupled with the second inductor via a first capacitor.

Example 22: An apparatus comprising: a driver circuit to generate a first clock signal at a first output and a second clock signal at a second output, wherein the second clock signal is an inverted version of the first clock signal, wherein when the first output and the second output are coupled with a coupled-resonator network and a clock distribution network, the first clock signal and the second clock signal each comprise both a first component comprising a first frequency at a first phase, and a second component comprising a second frequency at a second phase, the second frequency being a harmonic of the first frequency; and the coupled-resonator network to receive the first clock signal at a first node and the second clock signal at a second node, and in response to receiving the clock signal when coupled with the output of the driver circuit and the clock distribution network, the coupled-resonator network to simultaneously resonate at both the first frequency and first phase of the first component of the clock signal, and the second frequency and second phase of the second component of the clock signal.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:

1. An apparatus comprising:
   a driver circuit to generate a clock signal at an output, wherein the clock signal comprises both a first component comprising a first frequency, and a second component comprising a second frequency, wherein the second frequency is a harmonic of the first frequency; and
   a resonator circuit coupled to the output via a first node, the resonator circuit to receive the clock signal at the first node while the resonator circuit and the driver circuit are to be coupled to a clock distribution network via the first node, wherein, based on an impedance of the clock distribution network, the resonator circuit is to attenuate a difference between a first phase of the first component, and a second phase of the second component, wherein the resonator circuit comprises a first inductor, a second inductor to be magnetically coupled with the first inductor, and a first capacitor which is coupled between the first inductor at the first node and the second inductor, wherein the clock signal comprises one or more components in addition to the first component and the second component, the one or more additional components each comprising a frequency that is an odd-integer multiple of the first frequency.

2. The apparatus of claim 1, wherein the first capacitor is coupled to the first inductor via the node and coupled to the second inductor via a second node, and a second capacitor is coupled to the second inductor via the second node.

3. The apparatus of claim 1, further comprising the clock distribution network to receive the clock signal, the clock distribution network comprising one or more devices coupled with the node via an electrical conductor.

4. The apparatus of claim 1, wherein the first component of the clock signal has a first amplitude and the second component of the clock signal has a second amplitude, and the first amplitude is greater than the second amplitude.

5. The apparatus of claim 1, wherein the first component of the clock signal has a first amplitude and the second component of the clock signal has a second amplitude, and a ratio of the second amplitude to the first amplitude is a value in a range from 0.1 to 0.35.

6. The apparatus of claim 1, wherein the first phase of the first component of the clock signal is substantially equal to the second phase of the second component of the clock signal.

7. The apparatus of claim 6, wherein the first phase of the first component of the clock signal is in a range comprised of 10% or less of the second phase of the second component of the clock signal.

8. The apparatus of claim 1, wherein the first component of the clock signal has a first slew rate, the clock signal comprising both the first component and the second component has a second slew rate, and the second slew rate is greater than the first slew rate.

9. The apparatus of claim 1, wherein the resonator circuit is to simultaneously resonate at both a frequency in a range comprised of 10% or less of the first frequency of the first component of the clock signal, and a frequency in a range comprised of 10% or less of the second frequency of the second component of the clock signal.

10. The apparatus of claim 1, wherein the second frequency of the clock signal is a third harmonic of the first frequency.

11. The apparatus of claim 1, wherein the second frequency of the clock signal is an odd-integer multiple of the first frequency.

12. The apparatus of claim 1,
   wherein the clock signal comprises a differential clock signal comprising a first clock signal and a complimentary clock signal;
   wherein the output of the driver circuit comprises a first output and a second output, and the driver circuit comprises a first driver circuit to generate the first clock signal at the first output, and a second driver circuit to generate the complimentary clock signal at the second output;
   wherein the node comprises a first node for the resonator circuit to receive the first clock signal, and a complementary node for the resonator circuit to receive the second clock signal;
   wherein the clock distribution network is coupled with the first node and the second node; and
   wherein the first inductor comprises a first pair of serially connected inductors, the second inductor comprises a second pair of serially connected inductors, and the first capacitor comprises a first pair of capacitors connected in parallel.

13. The apparatus of claim 1, wherein the driver circuit is further to receive a first periodic signal and to generate clock signal based on the first periodic signal, wherein the output of the driver circuit comprises a first output and a second output, and the driver circuit further comprises:
   a first driver circuit comprising the first output;
   a second driver circuit comprising the second output;
   first switch circuitry to couple an input of the second driver circuit with the first periodic signal and the second output of the second driver circuit with the first output of the first driver circuit; and
   second switch circuitry, wherein the second switch circuitry is to disable the resonator circuit from resonating by disconnecting a terminal of the first inductor from a reference voltage.

14. An apparatus comprising:
   a driver circuit to generate a first clock signal at a first output and a second clock signal at a second output, wherein the second clock signal is an inverted version of the first clock signal, the first clock signal and the second clock signal each comprise both a first component comprising a first frequency, and a second component comprising a second frequency, wherein the second frequency is a harmonic of the first frequency; and
   a resonator circuit coupled to the output via first and second nodes, the resonator circuit to receive the first clock signal at the first node and the second clock signal at the second node, while the resonator circuit and the driver circuit are to be coupled to a clock distribution network via the first and second nodes, wherein, based on an impedance of the clock distribution network, the resonator circuit is to attenuate a difference between a first phase of the first component, and a second phase of the second component.

15. The apparatus of claim 14, wherein the resonator circuit further comprises:
   a first inductor, a second inductor to be magnetically coupled with a first inductor, and a first capacitor which is coupled between the first inductor and the second inductor; and
   a third inductor, a fourth inductor to be magnetically coupled with a third inductor, and a second capacitor which is coupled between the third inductor and the fourth inductor.

16. The apparatus of claim 14, further comprising the clock distribution network, wherein the clock distribution network is coupled with the first node and the second node.

17. The apparatus of claim 14, wherein the second frequency of the clock signal is an odd-integer multiple of the first frequency.

18. A system comprising:
   a processor and a memory to execute an operating system;
   a display device coupled to the processor, the display device to display an image based on a signal communicated to the display device;
   a driver circuit to generate a clock signal at an output, the clock signal comprising a first component comprising a first frequency, and a second component comprising a second frequency, the second frequency being a harmonic of the first frequency; and
   a resonator circuit coupled to the output via a first node, the resonator circuit to receive the clock signal at the first node while the resonator circuit and the driver circuit are to be coupled to a clock distribution network via the first node, wherein, based on an impedance of the clock distribution network, the resonator circuit is to attenuate a difference between a first phase of the first component and a second phase of the second component, wherein the resonator circuit comprises a first inductor, a second inductor to be magnetically coupled with the first inductor, and a first capacitor which is coupled between the first inductor at the first node and the second inductor, wherein the first component of the clock signal has a first slew rate, the clock signal comprising both the first component and the second component has a second slew rate, and the second slew rate is greater than the first slew rate.

19. The system of claim 18, wherein the first capacitor is coupled to the first inductor via the node and coupled to the second inductor via a second node, and a second capacitor is coupled to the second inductor via the second node.

* * * * *